United States Patent [19]

Utagawa

[11] Patent Number: 5,784,656
[45] Date of Patent: Jul. 21, 1998

[54] CAMERA WITH LIGHT DIVIDING DEVICES

[75] Inventor: Ken Utagawa, Kanagawa-ken, Japan

[73] Assignee: Nikon Corporation, Tokyo, Japan

[21] Appl. No.: 837,795

[22] Filed: Apr. 22, 1997

Related U.S. Application Data

[63] Continuation of Ser. No. 534,392, Sep. 27, 1995, abandoned.

[30] Foreign Application Priority Data

Dec. 5, 1994 [JP] Japan ................................ 6-300973
Dec. 5, 1994 [JP] Japan ................................ 6-300974

[51] Int. Cl.$^6$ ............................ G03B 3/00; G03B 13/36
[52] U.S. Cl. ........................................ 396/272; 396/386
[58] Field of Search ........................... 396/48, 152, 272, 396/386, 447; 352/205, 206

[56] References Cited

U.S. PATENT DOCUMENTS

| | | | |
|---|---|---|---|
| 3,127,809 | 4/1964 | Denk | 352/205 |
| 4,367,463 | 1/1983 | Suzuki et al. | 340/700 |
| 4,506,970 | 3/1985 | Fujibayashi | 354/406 |
| 5,019,854 | 5/1991 | Mukai et al. | 354/471 |
| 5,170,204 | 12/1992 | Mukai et al. | 354/409 |
| 5,212,514 | 5/1993 | Goto | 354/402 |
| 5,404,193 | 4/1995 | Harada | 354/409 |

FOREIGN PATENT DOCUMENTS 1-277225  11/1989  Japan .

OTHER PUBLICATIONS

*JCII Camera Museum News*, Japan Camera Museum News, Japan Camera Museum "Foca–flex" (1959), 1 page with English translation.

Primary Examiner—Safet Metjahic
Assistant Examiner—Michael Dalakis
Attorney, Agent, or Firm—Oliff & Berridge, PLC

[57] ABSTRACT

A camera that has the ability to direct the object light simultaneously to the imaging position and a first light receiving device and a second light receiving device that are arranged in places other than the imaging position (for example, an optical focus detection system and a monitor device of the object image) is disclosed. A first light dividing device is positioned in the light optical path of the light that is transmitted through the optical image forming system and reflects a portion of the light received and transmits another portion. A second light dividing device reflects a portion of the light that is reflected at the first light dividing device and transmits another portion. The light that is transmitted through the first light dividing device is directed to a primary imaging position. One of either the reflected light or the transmitted light of the second light dividing device is directed to the optical focus detection system, while the other one is directed to the monitor device. Additionally, an additional image is superimposed at a specified position on the subject image that is observed in the monitor device.

25 Claims, 26 Drawing Sheets

CAMERA WITH LIGHT DIVIDING DEVICES

This is a continuation of application Ser. No. 08/534,392 filed Sep. 27, 1995 now abandoned.

BACKGROUND OF THE INVENTION

1. Field of the Invention

The present invention relates to cameras that simultaneously direct optical images to multiple positions using light dividing devices. The present invention relates also to such cameras that can superimpose a specified image on the subject image for observation through an optical finder or the like.

2. Description of Related Art

With a conventional single lens reflex camera, a portion of the subject light transmitted by a phototaking lens 1, as shown in FIG. 29, is reflected to a finder optical system 3 of a monitor device by a quick return mirror 2, and another portion of the light is reflected to an optical focus detection system 5 by a sub-mirror 4 after transmission through the quick return mirror 2. In addition, at the time of exposure, the quick return mirror 2 and the sub-mirror 4 are positioned outside the primary optical path of the object light (the position shown by the double-dotted line in FIG. 29), and the subject light is directed to a film plane 6 that is located at the primary image pick-up position. However, the successive exposures cannot be made quickly with the aforementioned construction because the large quick-return mirror 2 must be driven to the double-dotted line position before the exposure, thereby delaying the exposure. Therefore, to decrease the time between exposures, as shown in FIG. 30, a partially reflecting mirror 7 is fixed in the optical path of the object light to replace the quick return mirror, and the object light is directed to both the finder optical system 3 and the film plane 6 at the same time so that movement of a quick return mirror during the exposure is unnecessary.

However, even in the example of FIG. 30 where a sub-mirror 4 is arranged at the back of the partially reflecting mirror 7 in order to direct the subject light to the optical focus detection system 5 side, it is necessary to move the sub-mirror 4 from the primary light path at the time of exposure, as shown by the double-dotted line in FIG. 30. Accordingly, during exposure, the subject light is not directed to the optical focus detection system 5. For this reason, for successive exposures, focus detection is interrupted, said interruption constituting an obstacle to decreasing the time between successive exposures.

Also in related art single-lens reflex cameras as shown in FIG. 29, a portion of the subject light projected through the phototaking lens 1 is reflected toward the finder optical system 3, that is used as a monitor device, by the quick return mirror 2. Another portion of the light is transmitted through the quick return mirror 2 and is reflected toward the optical focus detection system 5 by the sub-mirror 4. When exposure is carried out, the quick return mirror 2 and the sub-mirror 4 are retracted from the path of the subject light (to the position shown by the double-dotted line) and the subject light is transmitted to the film surface 6, which is placed in the primary imaging position. In this type of camera, when any type of display is carried out within the finder field (the area inside the photographic field frame), a light emitter 7 is arranged, for example, at the side of the focusing glass 3a, and the light beam emitted from the light emitter 7 is reflected by the quick return mirror 2 and illuminates the light diffusing display component of the focusing glass 3a (for an example, refer to Japanese Unexamined Patent Application Hei 1-277225). Alternatively, an appropriate mark is directly imprinted on the focusing glass 3a, displaying the focus detection area, photometering range, or the like.

With the conventional camera described above, since there are two mirrors, mirrors 2 and 4, between the focusing glass 3a and the optical focus detection system 5, it is difficult to align the position of the image projected onto the focusing glass 3a from the light emitter 7 or the position of the mark on the focusing glass 3a with the focus detection area established in the optical focus detection system 5. The same problem exists when the light receiving component of a photometering device or the like is arranged in place of the optical focus detection system 5.

SUMMARY OF THE INVENTION

An object of the present invention is to provide a camera that has the ability to direct the subject light simultaneously to the imaging position and a first light receiving device and a second light receiving device that are arranged in locations other than the primary imaging position (for example, an optical focus detection system and a monitor device for monitoring the subject image). The term primary imaging position is intended in the following to relate to the location of a film or other photosensitive device intended to provide the primary imaging for which the camera is being used.

Another object of the present invention is to provide a camera that can easily superimpose an additional image at a specified position on the subject image that is observed in a monitor device for monitoring the object image.

A camera of the present invention includes a first light dividing device that is positioned in the optical path of the light that is transmitted through the optical image forming system and that reflects a portion of the light received and that transmits another portion, and a second light dividing device that is positioned in the optical path of either the transmitted light or the reflected light of the first light dividing device and that reflects a portion of the light received and transmits another portion. In the present invention, the imaging light is divided into three components: light that is transmitted through the optical image forming system, interacts with a first light dividing device, and proceeds in a different direction than that of the direction of incidence toward the second light dividing device; the light reflected by the second light dividing device and the light transmitted by the second light dividing device. Accordingly, observance of the subject image, focus detection and photography can be performed simultaneously as one of the light components is directed to the primary imaging position, and the other two are directed to an optical focus detection system and a monitor device for monitoring the subject image. Thus, there is no need for movement of either the first light dividing device or the second light dividing device.

Instead of the optical focus detection system, a photoelectric detection system may be used.

In the present invention, the second light dividing device may reflect a portion of the light toward the first light dividing device and transmit another portion. In the present invention, a portion of the light reflected by the second light dividing device reflects to the first light dividing device and the remaining portion is transmitted. Accordingly, the light receiving device or monitor device for the light reflected from the second light dividing device may receive light transmitted or reflected after return to the first light dividing device. In this way, two light receiving devices can be efficiently arranged around the first light dividing device.

The second light dividing device of the present invention may be a partially reflecting mirror where the reflectivity and the transmissivity are each fixed with the second light dividing device uniformly dividing the light across the entire field of light received. Accordingly, it can distribute images with the same relative intensities to the light receiving devices of both the transmitted light and the reflected light of the second light dividing device. Also, the light transmitted by the second light dividing device may be transmitted to the primary imaging position.

The present invention may include a first area of the second light dividing device that transmits the light received with a fixed transmissivity and a second area where the reflectivity is larger and the transmissivity is smaller than the first area. Accordingly, the image that is directed to the second light dividing device may be divided according to the configuration of the first area and the second area.

The present invention may include a light convergent device that converges light reflected and/or transmitted by the second light dividing device. With the light reflected and transmitted by the second light dividing device converged toward the optical axis, more light is used by the optical system compared to the case without convergence.

In the present invention, the light dividing position of the second light dividing device may be set at an imaging position of light transmitted or reflected by the second light dividing device, and at least a portion of the light received by the second light division device may be diffused. The displacement amount between the image formation position adjacent the second light dividing device and the light dividing position at the second light dividing device changes according to the focus displacement amount (the displacement amount between the primary imaging position and the image formation position of the subject image) of the optical image forming system. In addition, the larger the focus displacement amount of the optical image forming system becomes, the higher the diffusion effect of the reflected light and transmitted light of the second light dividing device becomes, and the larger the degree of blurring becomes at the time of the observation of the image which is formed at the light dividing position of the second light dividing device.

The camera of the present invention may include a light dividing device that is positioned in the light optical path of the light that is transmitted through the optical image forming system and that reflects a portion of the light received and transmits the remaining portion, a second light dividing device that reflects a portion of the reflected light at the first light dividing device and transmits the remaining portion, and wherein the light that is transmitted through the first light dividing device is directed to an imaging position, and one of either the light reflected or transmitted by the second light dividing device is directed to an optical focus detection system, while the other one is directed to a monitor device for monitoring the object image. The transmitted light of the first light dividing device may be directed to the primary imaging position, and one of either the reflected light or the transmitted light of the second light dividing device may be directed to the optical focus detection system while the other one is directed simultaneously to a monitor device for monitoring the object image. Accordingly, it is possible to perform primary imaging, focus detection and observation of the object image simultaneously without moving the first and second light dividing devices.

The camera of the present invention may include a first light dividing device that is positioned in the light optical path of the light that is transmitted through the optical image forming system and that reflects a portion of the light received and transmits the remaining portion, and a second light dividing device that reflects a portion of the light that is transmitted through the first light dividing device and transmits the remaining portion and the light that is reflected at the first light dividing device may be directed to primary imaging position, and either one of the reflected light or the transmitted light of the second light dividing device may be directed to an optical focus detection system while the other one is directed to a monitor device for monitoring a subject image. Accordingly, it is possible to perform primary imaging, focus detection and observation of the object image simultaneously without moving the first or second light dividing devices.

In the present invention, the first light dividing device may include a partially reflecting mirror where the reflectivity and the transmissivity for light received are each fixed. The light that is directed to the first light dividing device may be divided in a uniform light amount ratio across the entire field of light received. Accordingly, it can distribute an image with the same relative intensities as the images directed to the primary imaging position and the second light dividing device.

In the present invention, the light that is transmitted through the first light dividing device that was reflected toward the first light dividing device by the second light dividing device may be directed to one of either an optical focus detection system or a monitor device for monitoring a subject image. The optical focus detection system and the monitor device can be positioned at opposite ends of the first light dividing device.

In the present invention, the light that is additionally reflected at the primary light dividing device, that was reflected toward the first light dividing device from the second light dividing device, may be directed to one of either an optical focus detection system or a monitor device for monitoring a subject image.

The optical focus detection system or the monitor device can be positioned in a different direction than that direction seen through the first light dividing device from the second light dividing device.

The present invention may include a light converging device that converges light toward the optical axis that is directed toward a monitor device from the second light dividing device. The image that is directed to the monitor device by convergence of the convergence device includes more light, providing a brighter image, than where there is no convergence.

In the present invention, the light dividing position of a second light dividing device may be set at the primary imaging position or at an optically conjugate position, and at least a portion of the area with the ability to direct light toward a monitor device of the second light dividing device may have a light diffusion effect. The displacement amount between the image formation position adjacent the second light dividing device and the light dividing position at the second light dividing device changes according to the focus displacement amount (the displacement amount between the primary imaging position and the image formation position of the subject image) of the optical image forming system. In addition, the larger the focus displacement amount of the optical image forming system becomes, the higher the diffusion effect of the light which is directed to the monitor device becomes, and the larger the degree of blurring of the image becomes which is observed at the monitor device.

In the present invention, the reflecting surface of the second light dividing device may be formed in a concave shape, and the light reflected by the second dividing device may be directed to a monitor device. In that case, light is not blocked to the image which is directed to the monitor device because the light that is directed by the second light dividing device is converged in the direction of the optical axis by the concave reflecting surface.

The present invention may include a convergent lens that bends the light reflected by a second light dividing device that is arranged between reflecting planes of a first light dividing device and a second light dividing device, and the light bent by the convergent lens may be directed to a monitor device so that light is not blocked to the image that is directed to the monitor device because the light reflected by the second light dividing device is bent in the direction of the optical axis by the convergent lens.

The present invention may include a first light dividing device that is positioned in the light optical path of the light which is transmitted through an optical image forming system and is constructed as a partially reflecting mirror where the reflectivity and the transmissivity are each fixed; and a second light dividing device that reflects a portion of the light reflected at the first light dividing device toward the first light dividing device, and transmits the remaining portion; the transmitted light of the first light dividing device is directed to a primary imaging position; the light that is transmitted through the second light dividing device is directed to an optical focus detection system; and the light that is transmitted through the first light dividing device that was reflected at the second light dividing device, is directed to a monitor device for monitoring a subject. A portion of the light that is transmitted through the optical image forming system may be divided uniformly in light amount ratio according to the transmissivity and reflectivity of the first light dividing device, an object image being uniformly dimmed and being directed to a primary image position. The light that is reflected at the first light dividing device may be directed to the second light dividing device, and that transmitted light may be directed to an optical focus detection system. A portion of the light that is reflected at the second light dividing device may be transmitted through the first light dividing device directed to a monitor device that is on the opposite side of the first light dividing device from the optical focus detection system.

The camera of the present invention may include a first light dividing device that is positioned in the optical path of the light that is transmitted through an optical image forming system and may be constructed as a partially reflecting mirror where the reflectivity and the transmissivity of the light received are each fixed; and a second light dividing device that reflects a portion of the light transmitted through the first light dividing device toward the first light dividing device, and transmits the remaining portion, wherein the light reflected by the first light dividing device is directed to a primary imaging position; and the transmitted light of the second light dividing device is directed to an optical focus detection system; and the light which is additionally transmitted through the first light dividing device, that was reflected at the second light dividing device, is directed to a monitor device for monitoring the subject image.

In the camera of the present invention, an optical focus detection system may extract the luminous flux for focus detection from multiple areas which are spaced apart in the sloping direction of the reflecting plane of a first light dividing device inside the light received image. A portion of the light that is transmitted through the optical image forming system is divided uniformly in a light amount ratio according to the transmissivity and reflectivity of the first light dividing device, and the object image that is uniformly dimmed is directed to the primary image position. The light that is transmitted by the first light dividing device is directed to the second light dividing device and that transmitted light is directed to the optical focus detection system. The light that is reflected at the second light dividing device is additionally reflected at the first light dividing device and then directed to the monitor device.

In the present invention, the acceptance plane of photoelectric conversion elements and the light sensitivity plane of the film may be positioned to receive images of a subject. A monitor device may include an optical finder that optically converts the light received to the subject image and/or an electronic finder that produces a subject image after photoelectric conversion of the light received. In the case of using an electronic finder, a re-image forming optical system that images the subject image at the acceptance plane of the photoelectric conversion elements may be used. The re-image forming optical system may be constructed to produce a demagnified image of an image that is made in the vicinity of the acceptance plane of the secondary light division means at the acceptance plane of the photoelectric conversion elements.

With the present invention, because there is no need to move either the first light division device or the second light division device off the optical axis of the optical image forming system, light at larger angles can be directed to the optical focus detection system than that shown in the related art examples of FIG. 29 and FIG. 30. Accordingly, a focus detection luminous flux can be extracted from a wider angular range than in the related art devices.

In a second aspect of the present invention, a superimposing device causes a specified additional image to be superimposed on the subject image that has been guided to the reflective surface of the second light dividing device.

A light emitting device that emits light in a pattern that corresponds to the additional image may be provided on the rear surface side of the reflective surface of the second light dividing device as a superimposing device that directs light toward the first light dividing device.

The superimposing device may be arranged so as to cause the additional image to be superimposed from the reflective surface side of the second light dividing device. The superimposing device may be positioned on the front or rear surface side of the reflective surface of the second light dividing device.

Particular areas of the reflection surface may have reflection characteristics that correspond to the pattern of the additional image. An illuminating device may be provided to illuminate the particular areas.

An optical focus detection system that extracts focus detection light rays from a focus detection area inside the photographic field may be positioned on the rear surface side of the reflective surface of the second light dividing device so as to receive the light transmitted by the second light dividing device, and wherein the superimposing device causes an image to display information related to focus detection to be superimposed on the subject image.

The optical focus detection system may be arranged so as to be able to move along the reflective surface of the second light dividing device, and a light emitting device that emits light on the rear surface side of the reflective surface of the second light dividing device may be provided as the superimposing device, and may be arranged so as to be able to move as one piece with the optical focus detection system.

The image from the light emitting device may be guided to the perimeter of the area that corresponds to the focus detection area of the reflective surface of the second light dividing device.

An additional image may be superimposed from the superimposing device onto the subject image of the reflective surface of the second light dividing device, and the superimposed image may be observed through the monitor device. Since a portion of the light guided to the second light dividing device passes to the rear surface side of the reflective surface, the relative positions of the superimposing position of the additional image by the superimposing device and of a light receiving device can be easily adjusted by guiding the transmitted light to a light receiving device such as an optical focus detection system. The light that passes through the first light dividing device and proceeds in a direction other than toward the second light dividing device can be guided to an imaging device that has been placed in the primary imaging position. Thus photography, observation of the object image, and other functions (for example, focus detection) can be simultaneously carried out. Film, photoelectric conversion elements, or the like can be used for the primary imaging device.

Since the light emitting device that is provided on the rear surface side of the reflective surface of the second light dividing device is outside the light paths of both the incident light and reflected light of the second light dividing device, the image of the light emitting device will not appear as an image that is observed in the monitor device when the light emitting device is not emitting light. When the light emitting device emits light, since this light passes the reflective surface of the second light dividing device, the light emission image of the light emitting device can be observed through the monitor device.

Since the additional image is superimposed from the reflective surface side of the second light dividing device, the additional image can be observed continually through the monitor device.

Images of specially configured areas formed on the reflective surface of the second light dividing device are observed through the monitor device.

The brightness of the images of the specially configured areas observed through the monitor device is increased.

The relative positions of the optical focus detection system and of the additional image superimposed by the superimposing device are easily adjusted.

When the optical focus detection system moves along the reflective surface of the second light dividing device, the focus detection area moves along with the movement of the optical focus detection system. When this movement occurs, since the light emitting also moves as one piece with the optical focus detection system, the relative positions of the focus detection area and of the light emitting position of the light emitting remain fixed.

The setting position of the focus detection area can be confirmed through the monitor device using the light emission image from the light emitting device.

BRIEF DESCRIPTION OF THE DRAWINGS

The invention will be described in detail with reference to the following figures in which like reference numerals refer to like elements and wherein.

DETAILED DESCRIPTION OF PREFERRED EMBODIMENTS

An explanation is provided hereafter of embodiments of the present invention with references to FIG. 1 through 30.

Figure 1:
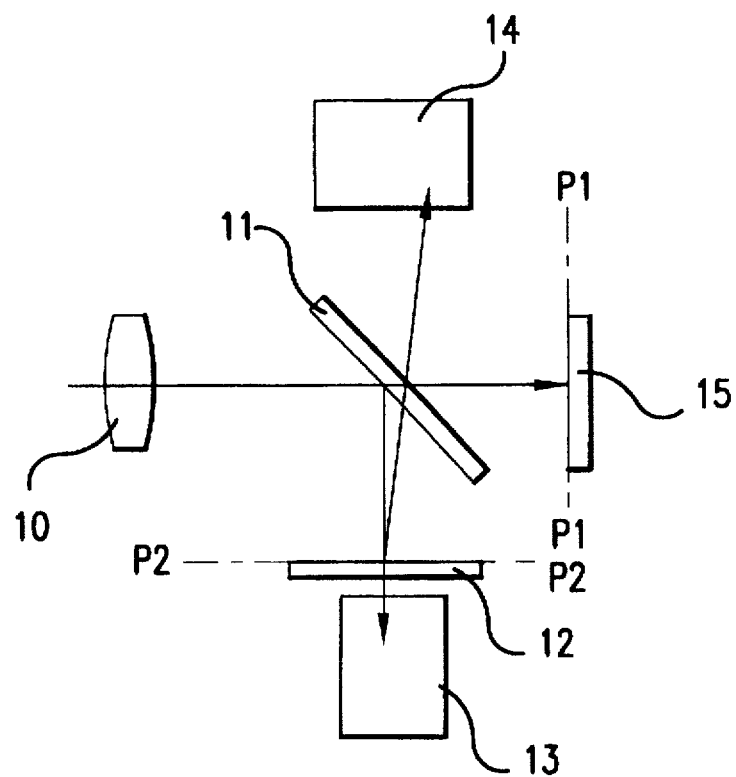
FIG. 1 is an illustration of a simplified side view of one arrangement of optical elements for a first aspect of the present invention.

FIG. 1 is a simplified side view of a first arrangement of optical elements according to a first aspect of the present invention. A portion of the light from a subject passing through a photographic lens 10 is reflected by a first light dividing device 11 and a portion of the light is transmitted. The transmitted portion of the light is received by an imaging device 15 at a plane P1-P1 that is a real image plane of the subject when the subject is in focus, and the reflected portion is received by a secondary light dividing device 12, that is also a real image plan of the subject when the subject is in focus. Light transmitted by the secondary light dividing device is received by an optical focus detection system 13. Light reflected by the second light dividing device 12 and transmitted by the first light dividing device 11 is received by a monitoring device 14.

Figure 2:
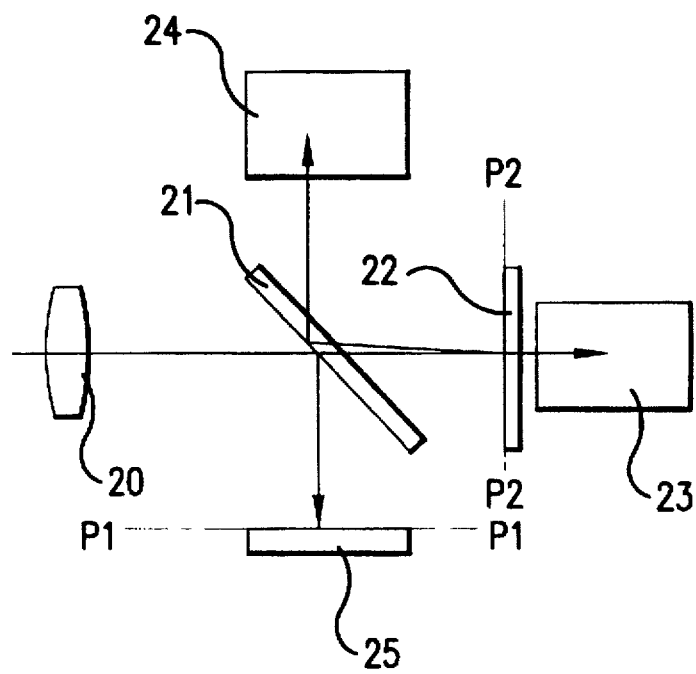
FIG. 2 is an illustration of a simplified side view of a second arrangement of optical elements for the first aspect of the present invention.

FIG. 2 is a simplified side view of a second arrangement of optical elements according to a first aspect of the present invention. A portion of the light from a subject passing through a photographic lens 20 is reflected by a first light dividing device 21 and a portion of the light is transmitted. The reflected portion of the light is received by an imaging device 25 at a plane P2-P2, that is a real image plane when the subject is in focus, and the transmitted portion is received by a second light dividing device 22, that is also a real image plane when the subject is in focus. Light transmitted by the secondary light dividing device 22 is received by an optical focus detection system 23. Light reflected by the second light dividing device 21 and transmitted by the first light dividing device is received by a monitoring device 24.

A more detailed explanation of the first aspect of the present invention will be described in the following with reference to FIG. 3 through FIGS. 15(a)–(b).

Figure 3:
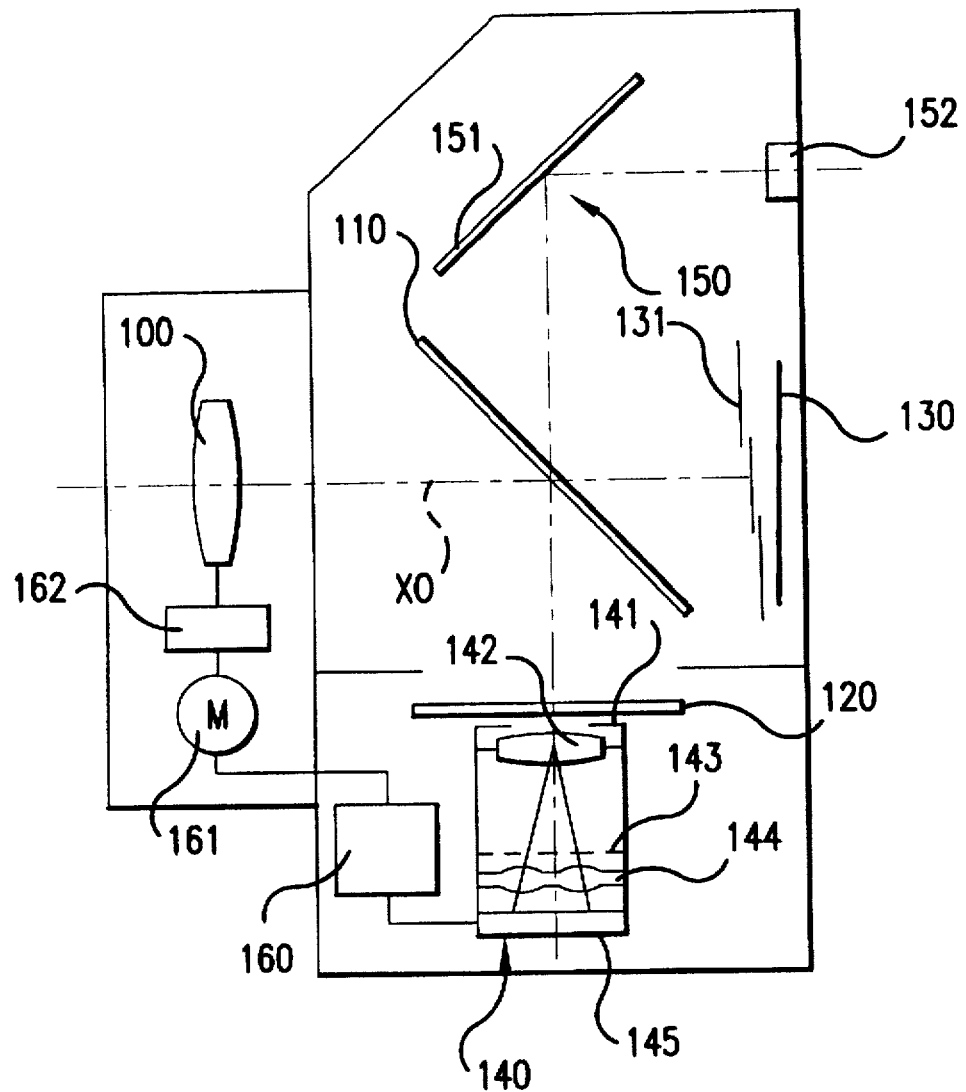
FIG. 3 is an illustration of the internal structure of a camera according to a first embodiment of the first aspect of the present invention.
Figure 4:
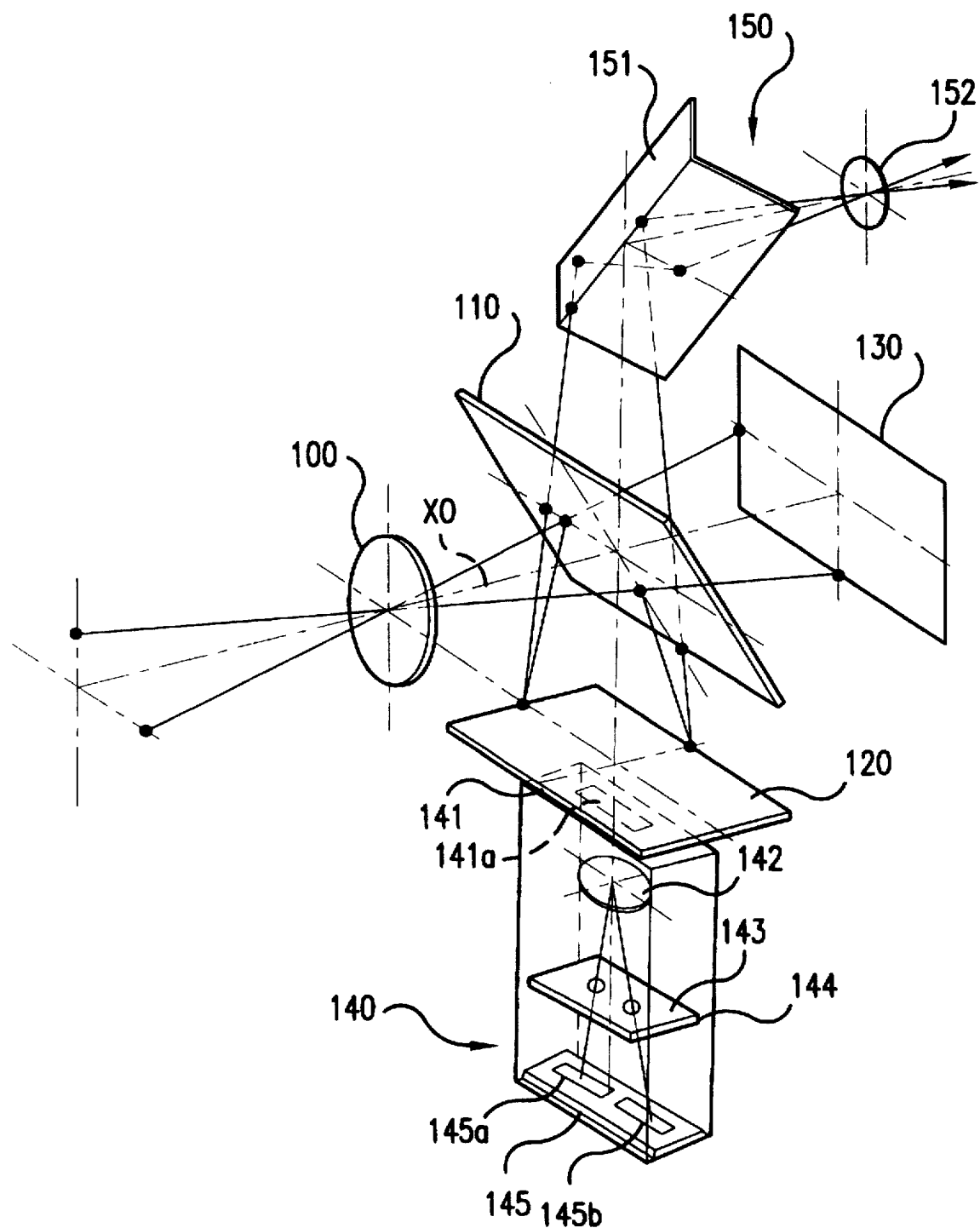
FIG. 4 is an illustration of a perspective side view of the optical system of the camera of FIG. 3.

FIG. 3 shows the internal structure of a camera according to the first aspect of the first embodiment of the present invention. FIG. 4 shows a perspective side view of the optical system. FIGS. 3 and 4 show a photographic lens 100, a first mirror 110, a second mirror 120, film 130, an optical focus detection system 140, and an optical finder 150. The first mirror 110 and the second mirror 120 are both constructed as partially reflecting mirrors, and the reflectivity and transmissivity of both are fixed values across the entire range of light received. The reflectivity and transmissivity of the first mirror 110 can be selected over a wide range, but the transmissivity of the first mirror should be set so that more than 50% of the luminous flux which is transmitted through the phototaking lens 100 reaches the film 130. The reflectivity of the second mirror 120 is set above 10% and preferably above 40%, and the transmissivity is set above 10%, and preferably above 20% to 60%.

The first mirror 110 is inclined toward the vicinity of the optical focus detection system 140 the farther it is from the phototaking lens 100. The sloping angle of the reflecting plane of the first mirror 110 relative to the optical axis X0 of the photographic lens 100 is about 45°. The reflecting plane of the second mirror 120 is positioned approximately orthogonal to the direction of the light reflected from the first mirror 110. The light sensitive plane of the film 130 orthogonally crosses the optical axis X0 of the phototaking lens 100. The shutter blades 131 are positioned between the first mirror 110 and the film 130.

The optical focus detection system 140 is positioned directly below the second mirror 120. The optical focus detection system 140 directs the photographic subject light, which passes through a symmetrical pair of areas at the optical axis X0 of the exit pupil plane of the phototaking lens 100, through the field of view mask 141, through the field lens 142 and one aperture of the diaphragm mask 143 and one separator lens 144 to the symmetrical light receiving planes 145a and 145b of the image sensor 145. The position of the aperture 141a of the field of view mask 141 corresponds to the position of the focus detection area and the photographic picture plane. In this example, only the rectangular shaped area of the central component of the photographic picture plane is set at the focus detection area. The image sensor 145 outputs an electric signal corresponding to the luminance distribution of the pair of images which is projected to the light receiving planes of 145a and 145b. The output signal of the image sensor 145 is input to a control circuit 160. The control circuit 160 calculates the focus displacement amount of the phototaking lens 100 based on the output signals from the image sensor 145, and based on the calculated result, the motor 161 is operated. The driving rotation of the motor 161 is converted by the drive mechanisms 162 to movement of the phototaking lens 100 in the optical axis direction. The optical finder 150 has a roof edge mirror 151 and an eye-piece lens 152. The reflecting surfaces of the roof edge mirror 151 are further from the first mirror 110 the closer the surfaces are to the eye-piece lens 152.

By means of the above construction, the light which is transmitted through the photographic lens 100 is divided into the transmitted light of the first mirror 110 and the reflected light of the first mirror 110, and the transmitted light is directed to the light sensitive plane side and the reflected light is directed to the second mirror 120 side. A portion of the light incident to the second mirror 120 is transmitted through the second mirror 120 and is then directed to the optical focus detection system 140, and the remaining portion is reflected in the direction of the first mirror 110 side. A portion of the reflected light of the second mirror 120 is transmitted through the first mirror 110 and is then directed to the optical finder 150. Accordingly, since the image of the object is simultaneously directed to the light sensitive plane of the film 130 and the optical focus detection system 140 and the optical finder 150, the film exposure and focus detection and observance of the object image are all performed simultaneously. In this embodiment, the film 130 is positioned on the optical axis X0 of the phototaking lens 100 the same as the camera of the prior art shown in FIG. 29, and because the optical focus detection system 140 is positioned toward the bottom of the first mirror 110 and the optical finder 150 is positioned toward the top, the present invention is applied without major changes in the basic layout of the single lens camera of the related art.

Figure 5:
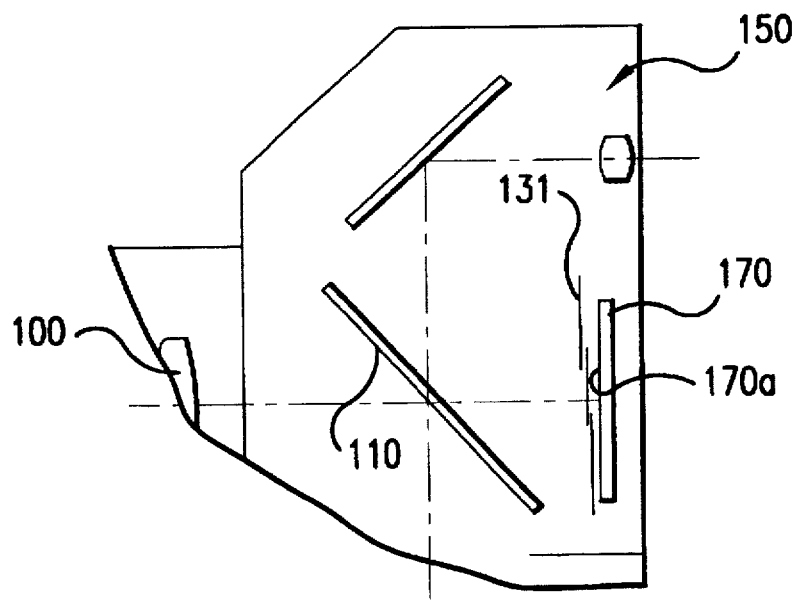
FIG. 5 is an illustration of an alternative image sensor and optical finder arrangement to that of FIG. 3.
Figure 6:
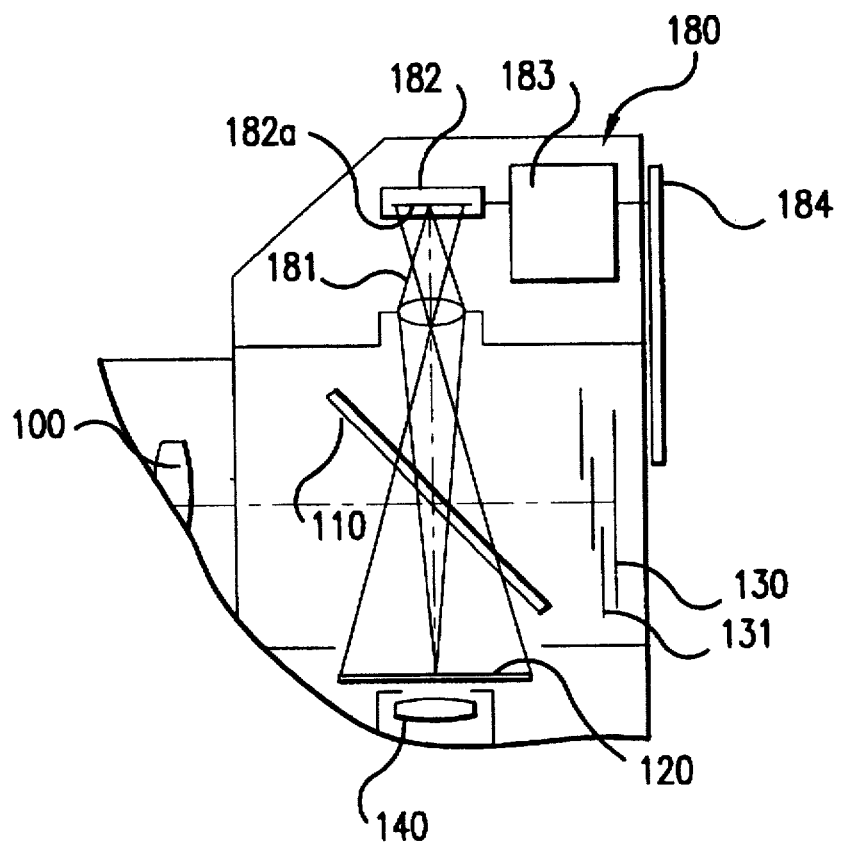
FIG. 6 is an illustration that shows an alternative image sensor and electronic finder arrangement to that of FIG. 3.

Furthermore, while in this embodiment the film 130 was positioned at the imaging position, as shown in FIG. 5, the acceptance plane 170a of an image sensor 170 can also be positioned there. Also, in place of the optical finder 150, as shown in FIG. 6, an electronic finder 180 can also be arranged. In this electronic finder 180, the image in the vicinity of the reflecting plane of the second mirror 120 is re-imaged by the re-imaging lens 181 onto the acceptance plane 182a of the image sensor 182, and the output signal of the image sensor 182 is processed by the monitor control circuit 183. Then an object image is displayed on the monitor display (for example a liquid crystal panel) 184. In this example, because the image of the reflecting plane of the second mirror 120 is projected reduced onto the acceptance plane 182a by way of the re-imaging lens 181, the image sensor is scaled down and the cost can be reduced. Regarding the reduction scale ratio, ½ to ¹⁄₂₀ is appropriate and especially ⅓ to ⅛ is preferred.

Figure 7A:
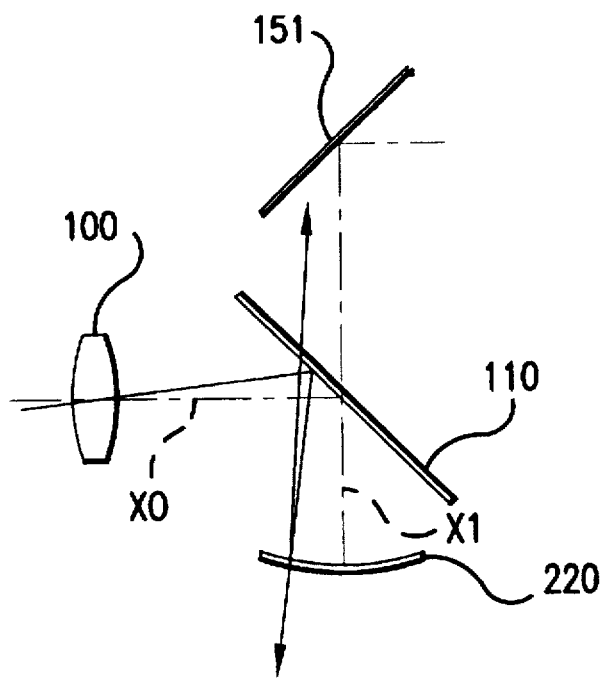
FIG. 7(a) is an illustration of a first arrangement of optical elements according to second embodiment of the first aspect of the present invention.
Figure 7B:
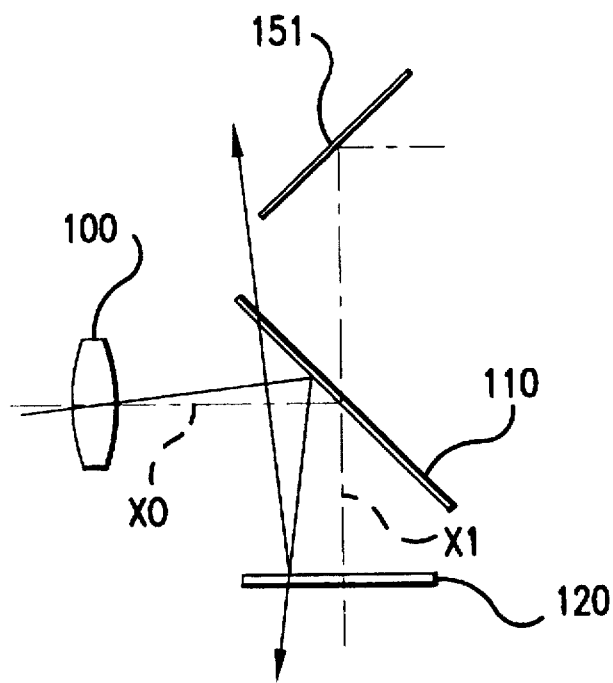
FIG. 7(b) is an illustration of the basic optical elements of the FIG. 3 embodiment.

FIG. 7(a) shows a first arrangement of optical elements according to a second embodiment of the first aspect of present invention, and FIG. 7(b) shows the corresponding components of the first embodiment. All other components than those shown here are identical to the first embodiment.

As is shown in FIG. 7(b), the light which is incident to the first mirror 110 and is beginning to separate from the optical axis X0 of the photographic lens 100 diverges from the optical axis X1 of the first mirror 110. A portion of the light from the first mirror 110 is reflected from the reflecting plane of the second mirror 120 so as to be increasingly farther from the optical axis X1. Therefore, it is necessary for the light receiving plane area of the roof edge mirror 151 to be very large in order to receive the light without leakage of the reflected light from the entire reflecting plane of the second mirror 120. As shown in FIG. 7(a), when the light receiving plane area of the roof edge mirror 151 is restricted to a small size, the object image can only be observed in the area in the vicinity of the optical axis X1. Therefore, in this embodiment, in place of the second mirror 120 of the first embodiment, as shown in FIG. 7(a), a second mirror 220 having a reflecting plane of a concave shape is arranged. In this way, since the reflected light of the second mirror 220 is directed toward the optical axis X1, the light receiving plane area of the roof edge mirror 151 can be small. When also using the electrical finder 180 of FIG. 6 in place of the optical finder 150, the reflected light from the entire reflecting plane of the second mirror 120 is received in the aperture of the re-imaging lens 181, and can be directed at the image sensor light receiving plane 182a.

Figure 9:
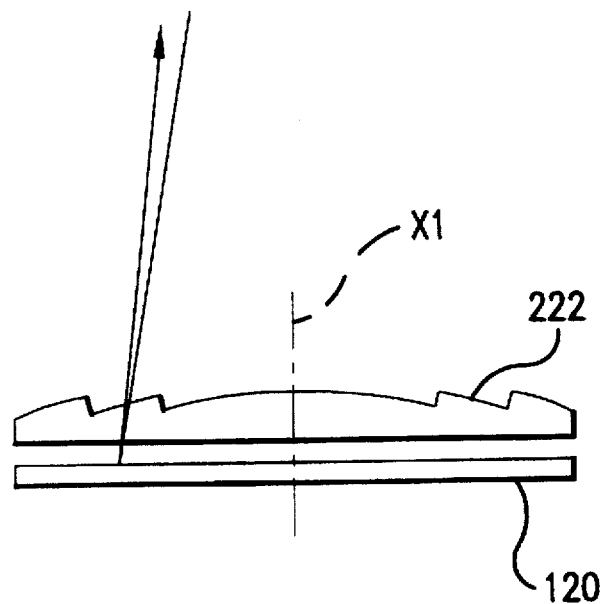
FIG. 9 is an illustration of a third arrangement of optical elements for the second embodiment of the first aspect of the present invention.
Figure 10:
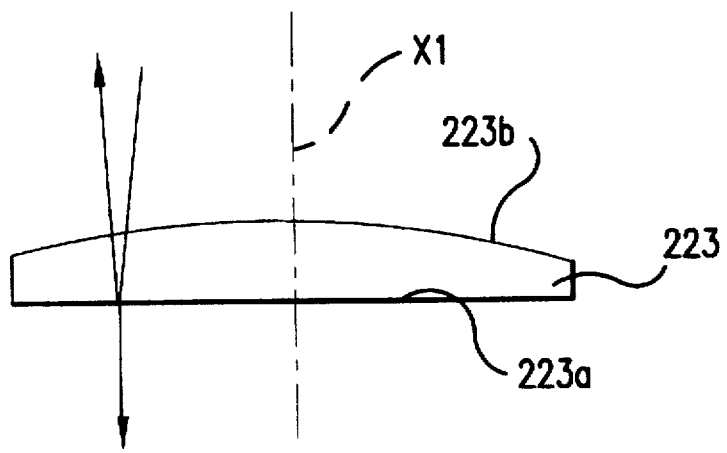
FIG. 10 is an illustration of a fourth arrangement of optical elements for the second embodiment of the first aspect of the present invention.

Moreover, light deflection devices that have a converging effect on the light of the second mirror are not restricted to concaveness of the reflecting surface. Variations are shown in FIGS. 8–10.

Figure 8:
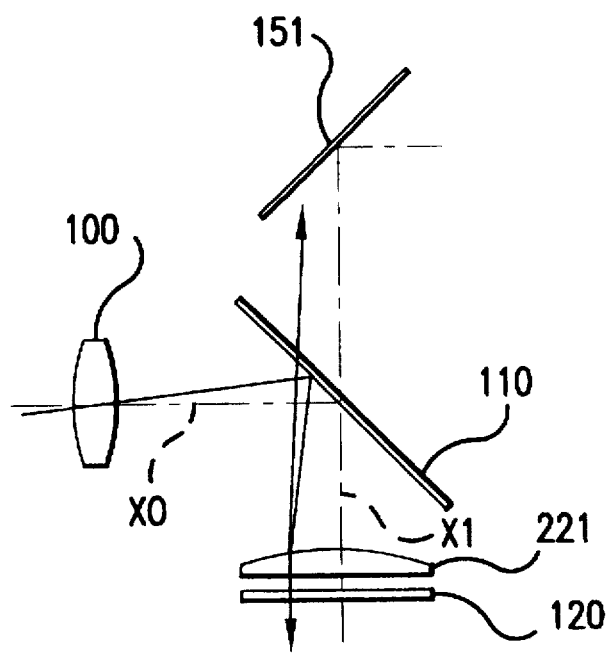
FIG. 8 is an illustrative of a second arrangement of optical elements for the second embodiment of the first aspect of the present invention.

In FIG. 8, a convex lens 221 is arranged directly in front of the reflecting plane of the second mirror 120. In FIG. 9, a convex lens 222 of Fresnel lens shape is used. In FIG. 10, the translucent reflecting plane 223a is formed at the bottom plane side of the same convex lens 223 as in FIG. 8, and the second mirror 120 is omitted. The reflectivity and transmissivity of the reflecting plane 223a is the same as the second mirror 120. The reflectivity of the convex plane 223b of the convex lens 223 is set to be as small as possible, and preferably below 5%.

Figure 11:
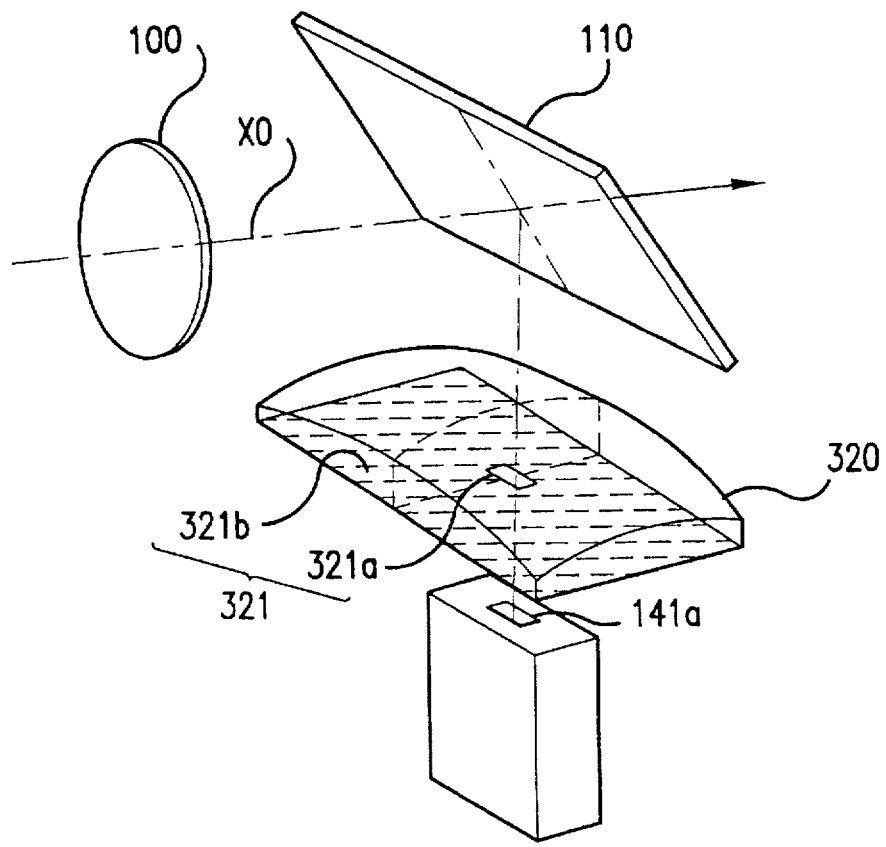
FIG. 11 is an illustration of a perspective side of an optical system according to a third embodiment of the first aspect of the present invention.
Figure 12:
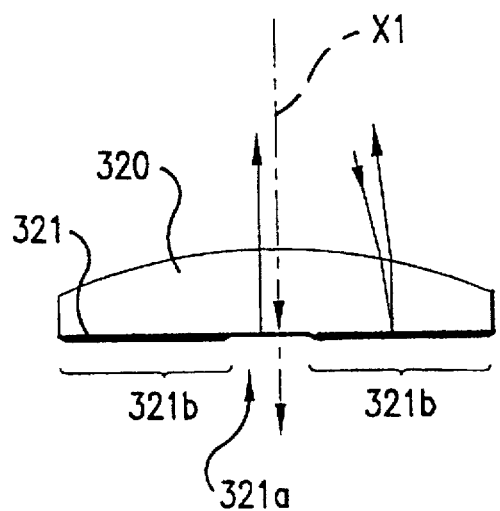
FIG. 12 is an illustration of a sectional view of the convex lens of FIG. 11.

FIGS. 11 and 12 show optical components of an optical system of a camera according to a third embodiment of the first aspect of the present invention. All components other than those shown here are identical to the other embodiments.

As shown in FIGS. 11 and 12, in this embodiment, the convex lens 320 is positioned in the optical path of the reflected light of the first mirror 110. The bottom plane 321 is sectioned into the first area (the transmissive component) 321a and the second area (the reflective component) 321b. In the first area 321a, the size and position of the aperture 141a of the field of view mask 141 of the optical focus detection system 140 are nearly the same, and the transmissivity is set sufficiently larger than the second area 321b. Because there is no need for the second area 321b to direct light to the optical focus detection system 140, the reflectivity is set as high as possible. For example, in the second area 321b, it is preferred to have a reflective plane of high reflectivity above 80% using a multilayer film over the entire reflecting area or using aluminization.

Through the above construction, as shown in FIG. 12 by the indicating arrows, the greater portion of the light arriving to the first area 321a of the convex lens 320 is transmitted through that area 321a and then is directed to the optical focus detection system 140; and the greater portion of the light arriving to the first area 321b is reflected to the first mirror 110 side and then directed to either the optical finder 150 of FIG. 3 or the electrical finder 180 of FIG. 6.

Accordingly, enough light passes to both the optical focus detection system 140 and the optical finder 150 (or the electrical finder 180). Because the observation of the object image inside the focus detection area at the optical finder 150 (or electronic finder 180) becomes difficult when the reflectivity of the first area 321a is set excessively small, it is also desirable to give the first area 321a the proper reflectivity.

Figure 13:
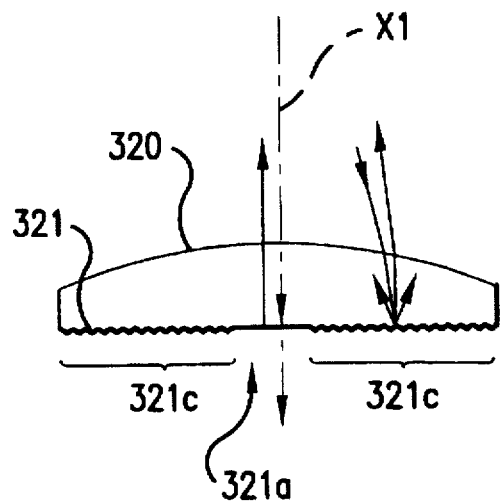
FIG. 13 is an illustrative of a sectional view of an alternative convex lens for the optical system of FIG. 11.

Moreover, in place of the second area 321b of FIG. 12, as shown in FIG. 13, a second area 321c has a light diffusion effect can also be used. In this case, because as the size of the focus displacement according to the light sensitive plane film of the photographic lens 100 gets larger the degree of blurring of the viewed object image at the optical finder 150 or the electrical finder 180 gets larger, the condition of the focus displacement can be accurately observed by way of the optical finder 150 or the electrical finder 180. Moreover, when using the second area 321c which has the light diffusion effect, the second area 321c and the film 130 are conjugate, so that the convex lens 320 can be configured.

Figure 14:
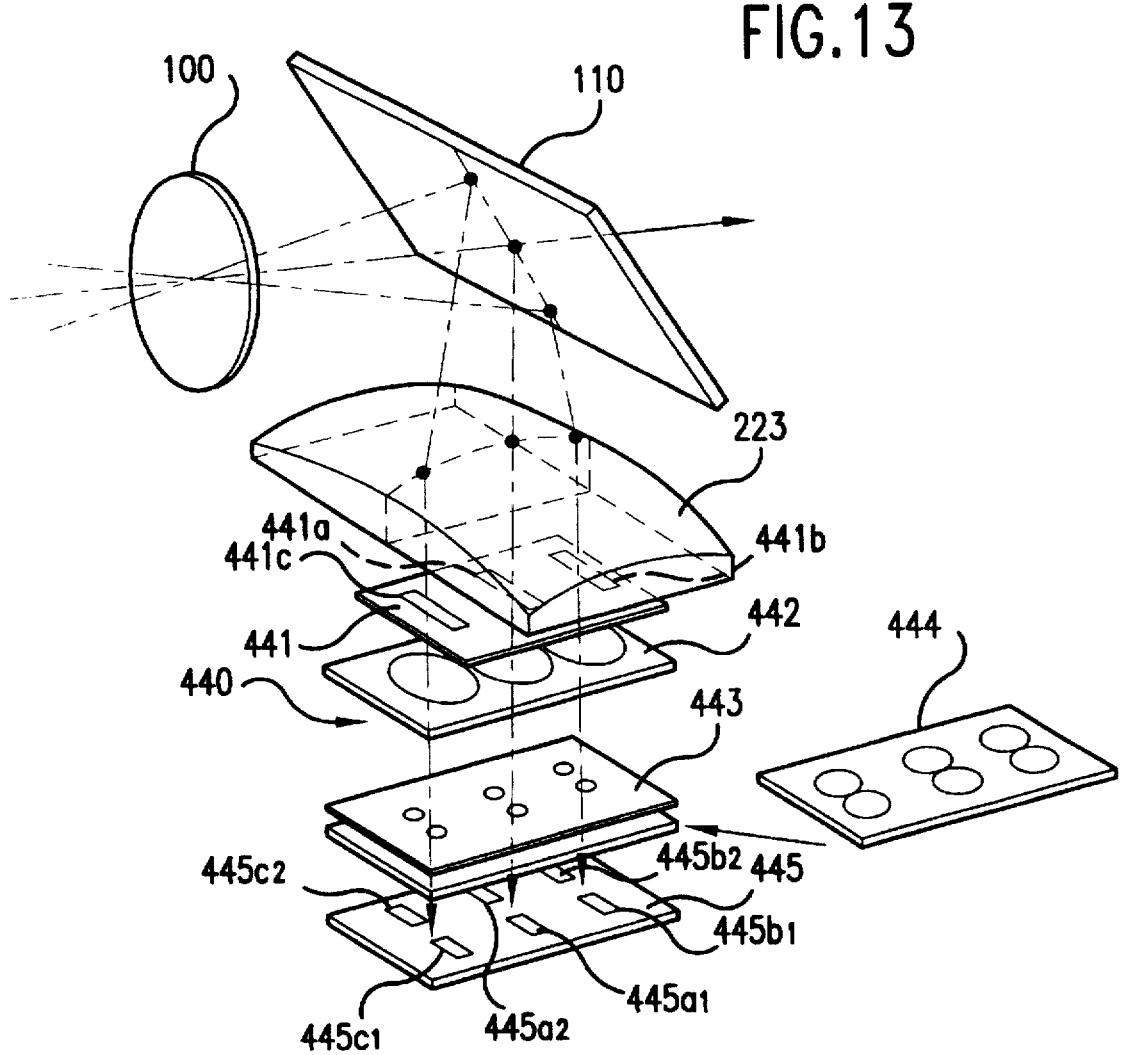
FIG. 14 is an illustration of a perspective side view of an optical system according to a fourth embodiment of the first aspect of the present invention.

FIG. 14 is an illustration of a perspective side view of an optical system of a camera according to a fourth embodiment of the first aspect of the present invention.

In the camera of this embodiment, as shown in the aforementioned FIG. 10, the reflecting light from the first mirror 110 enters the convex lens 223, and a portion of that incident light is reflected by the reflecting plane 223a, and the remaining portion enters the optical focus detection system 440. The optical focus detection system 440 directs the light which passed through the specified area of the exit pupil plane of the same photographic lens 11 as that in FIG. 3 and FIG. 4, through the field of view mask 441, the field lens 442, the diaphragm mask 443 and the separator lens 444 to the image sensor 445. However, in the example in FIG. 4, the aperture 141a is arranged in only one place of the center of the photographic picture plane, but in the field of view mask 441 in this embodiment, there are three apertures arranged; the aperture 441a corresponding to the center part of the photographic picture plane; and the apertures 441b and 441c which are separated from the center of the photographic picture plane. In this embodiment, the three focus detection areas are set according to the appropriate spacing based on the slope of the first mirror 110. According to this, in the image sensor 445, the total of three pairs of light receiving planes 445a1 and 445a2, and 445b1 and 445b2, and 445c1 and 445c2 are arranged by one left and right pair being one focus detection area; and the construction elements from the field lens 442 to the separator lens 444 also are constructed so as to divide the light of each of the focus detection areas into one pair of the light receiving plane.

Figure 15A:
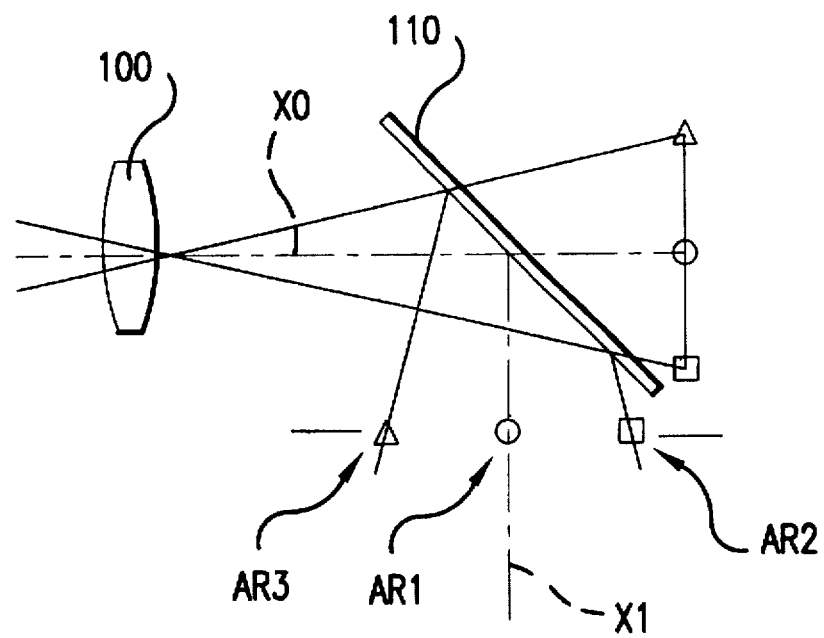
FIG. 15(a) is an illustration that demonstrates the operational effect of the fourth embodiment on focus detection areas.
Figure 15B:
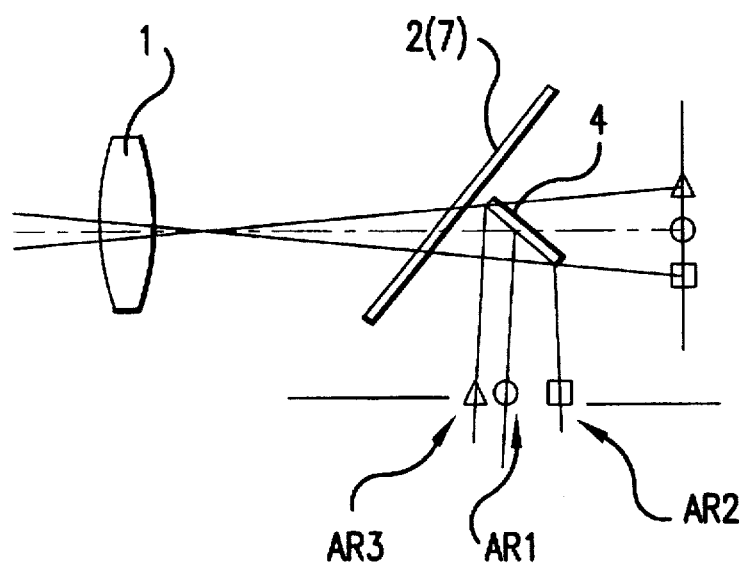
FIG. 15(b) is an illustration of the position of the focus detection areas for a related art example.
Figure 29:
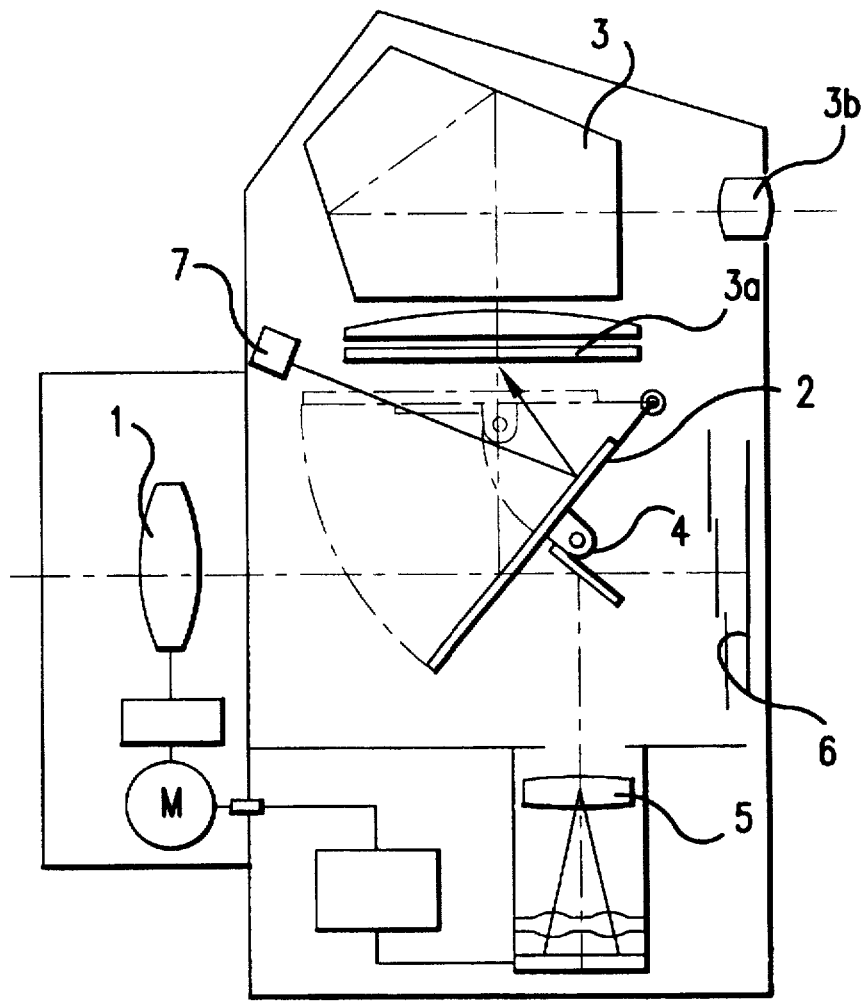
FIG. 29 is an illustration of the internal structure of a related art single lens reflex camera.
Figure 30:
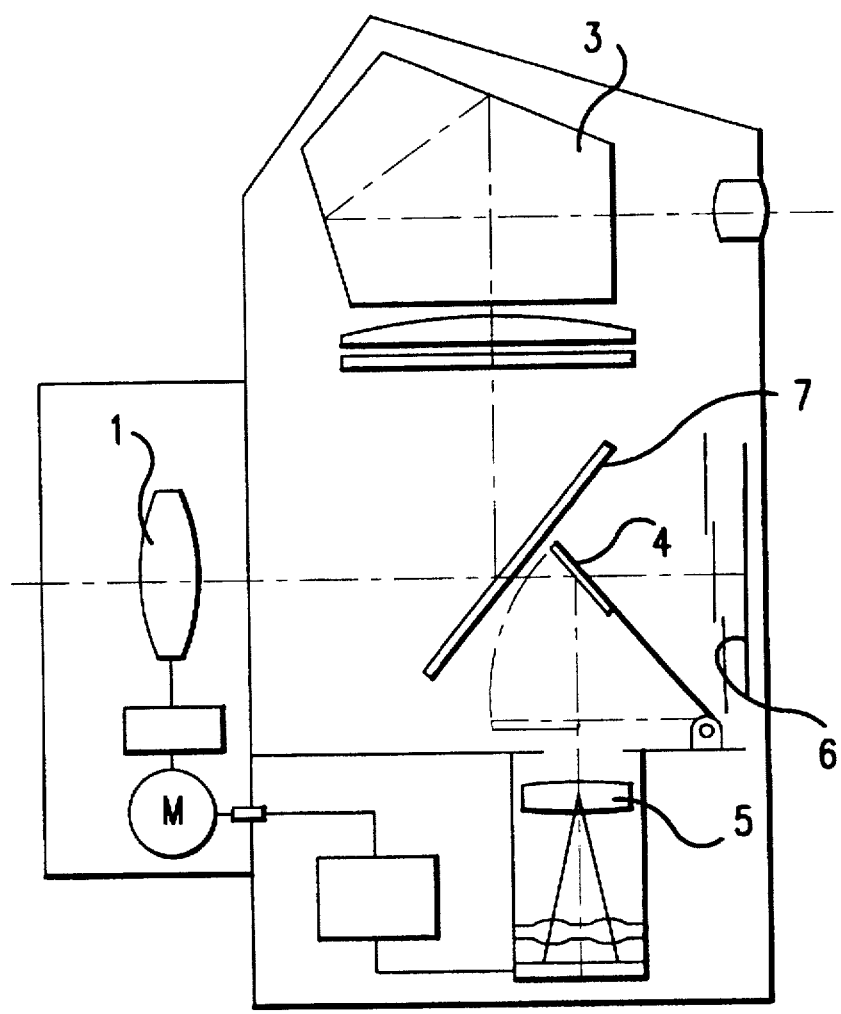
FIG. 30 is an illustration of the internal structure of another related art single lens reflex camera.

FIG. 15(a)-15(b) are illustrations that compare the focus detection area of this embodiment to the case where the same focus detection areas as this embodiment are in the related art of FIG. 29 and FIG. 30 are arranged. FIG. 15(a) shows this embodiment and FIG. 15(b) shows the case of the related art example. As is obvious from FIG. 15(b), in the camera of the related art, the width of the sub-mirror 4 with respect to the direction of the optical axis X0 of the photographic lens is small. For this reason, sub-mirror 4 can only reflect to the optical focus detection system the light that is in the vicinity of the optical axis X0 and the spacing of the focus detection areas AR1 through AR3 cannot be large. However, as shown in FIG. 15(a), in this embodiment, because the light of nearly the entire photographic picture plane can be directed to the optical focus detection system by way of the first mirror 110, the spacing of the focus detection areas AR1 through AR3 can be set large.

In the above embodiment, the photographic lens 100 comprises the optical image forming system; the first mirror 110 comprises first light dividing means; the second mirror 120, 220, convex lens 223, reflecting plane 223a of 320, 321 comprise second light dividing means; the second mirror 220, convex lens 221, 222, 223, 320 comprise convergence means; the convex lens 221, 222, 223, 320 comprise alternative convergence lenses; and the optical finder 150 or electrical finder 180 comprises monitor means. Moreover, in the above embodiment, the transmitted light of the first mirror 110 is directed to the imaging position, but the reflected light of the first mirror 110 can also be directed to the imaging position.

A second aspect of the present invention are described below with regard to additional embodiments of the present invention with reference to FIG. 16-FIG. 29.

Figure 16:
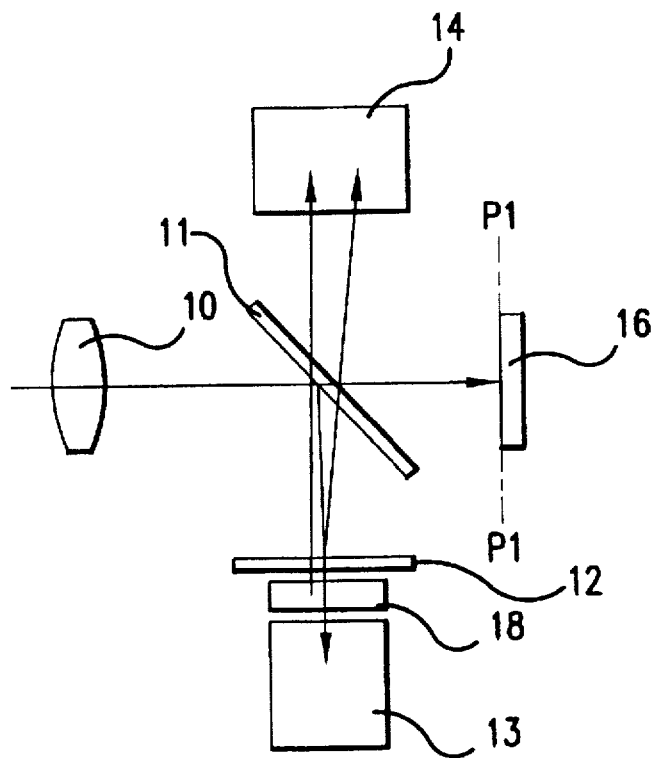
FIG. 16 is an illustration of a simplified side view of one arrangement of optical elements, similar to FIG. 1, but illustrating a second aspect of the present invention.

FIG. 16 is the same as FIG. 1 except that a light emitting device 18 is positioned between the secondary light dividing device 12 and the optical focus detection system 13. Light from the light emitting device 18 is transmitted through the second light dividing device 12 and the first light dividing device to the monitor device 14. The light emitting device provides an additional image at a specified position on the subject image that is observed in the monitor device.

Figure 17:
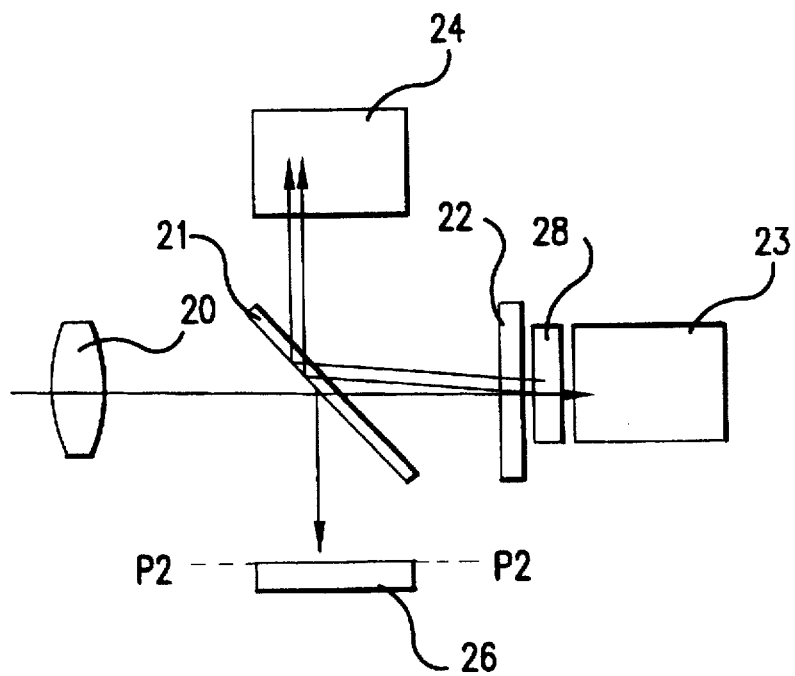
FIG. 17 is an illustration of a simplified side view of a second arrangement of optical elements, similar to FIG. 2, but illustrating a second aspect of the present invention.

FIG. 17 is the same as FIG. 2 except that a light emitting device 28 is positioned between the secondary light dividing device 22 and the optical focus detection system 23. The light emitting device operates in a manner similar to that set out with regard to FIG. 1, but with reflection from the first light dividing device, rather than transmission, providing an additional image at a specified position on the subject image that is observed in the monitor device.

A more detailed explanation of the second aspect of the present invention will be described in the following with reference to FIG. 18-FIG. 28(c).

Figure 18:
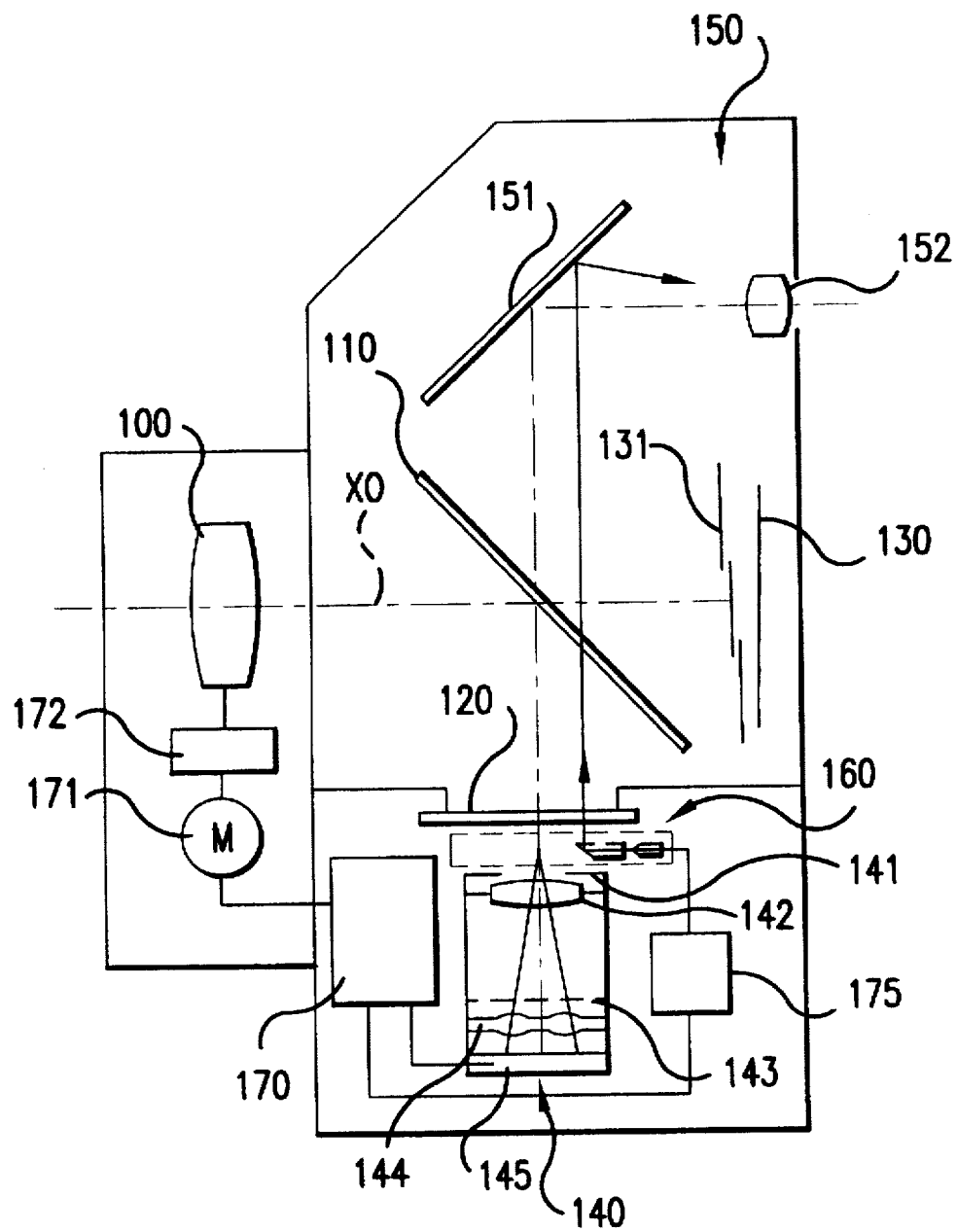
FIG. 18 is an illustration of the internal structure of a camera according to a first embodiment of the second aspect of the present invention.
Figure 19:
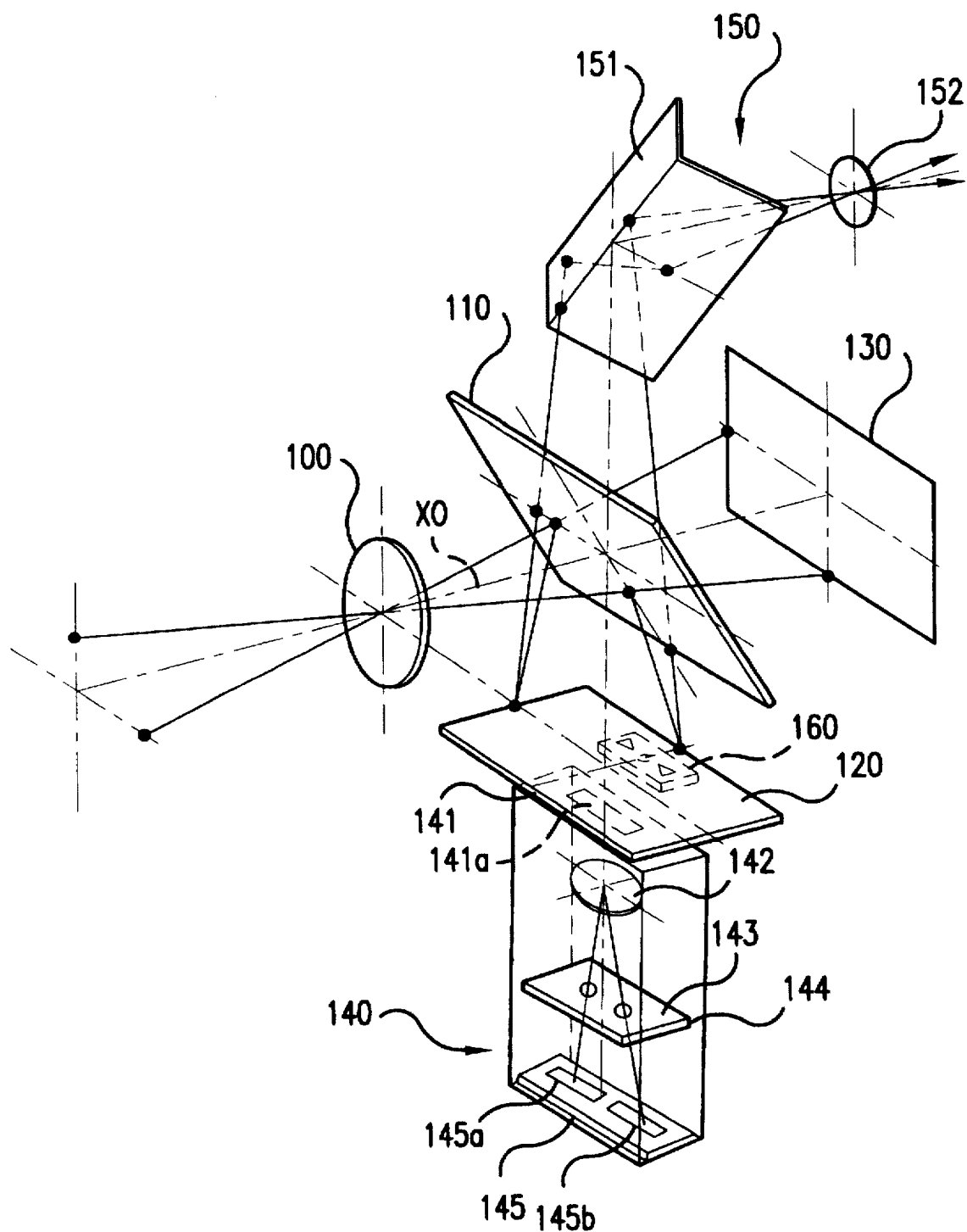
FIG. 19 is an illustration of a perspective side view of the optical system of the camera of FIG. 18.

FIG. 18 shows an outline of the internal structure of the camera of the first embodiment of the second aspect of the present invention; FIG. 19 shows an oblique view of the optical system. FIGS. 18 and 19 show a phototaking lens 100, a first mirror 110, a second mirror 120, film 130, an optical focus detection system 140, an optical finder 150, and a display unit 160. The first mirror 110 and the second mirror 120 each comprise partially reflecting mirrors, and the reflection ratio and transmission ratio of each is a fixed value over the entire surface of the light receiving range. The reflection ratio and transmission ratio of the first mirror 110 can be set over a wide range, but it is preferable to set the transmission ratio of the first mirror 110 so that 50% or more of the light rays that pass the photography lens 100 reach the film 130. The reflection ratio of the second mirror 120 should be set above 10%, preferably above 40%. The transmission rate of the second mirror 120 should be set above 10%, preferably 20-60%.

The first mirror 110 is inclined so that portions of the first mirror further from the optical focus detection system 140 are closer to the photography lens 100. The angle of inclination of the reflective surface of the first mirror 110 with respect to the optical axis X0 of the phototaking lens 100 is approximately 45°. The reflective surface of the second mirror 120 is positioned so as to be approximately perpendicular to the direction of the light reflected from the first mirror 110. The exposure surface of the film 130 is perpendicular to the optical axis X0 of the phototaking lens 100. Shutter blades 131 is positioned between the first mirror 110 and the film 130. An image sensor may be positioned in place of the film 130.

The optical focus detection system 140 is positioned on the rear surface side of the reflective surface of the second mirror 120. The optical focus detection system 140 guides subject light that has passed a pair of areas which are symmetrical about the optical axis X0 of the projection pupil surface of the phototaking lens 100 to the pair of light receiving surfaces 145a and 145b of the image sensor 145 via the field of view mask 141, the field lens 142, the diaphragm mask 143, and the separator lenses 144. The position of the aperture 141a of the field of vision mask 141 corresponds to the position of the focus detection area inside the photographic field. In this example, only the rectangular region in the center of the photographic field is set as the focus detection area. The image sensor 145 outputs electrical signals that correspond to the brightness distribution of the pair of images that have been projected onto the light receiving surfaces 145a and 145b. The output signals of the image sensor 145 are transmitted to the controlling circuit 170. The controlling circuit 170 calculates the focus shift amount of the phototaking lens 100 based on the output signals from the image sensor 145, and drives the motor 171 based on the calculated result. The rotation of the motor 171 is converted to movement in the optical axis direction of the phototaking lens 100 by the driving mechanism 172, and the phototaking lens 100 moves toward the focused position. The optic finder 150 has a roof edge mirror 151 and an eyepiece lens 152. The reflective surfaces of the roof edge mirror 151 are inclined so as to be further from the first mirror 110 the closer the surfaces are to the eyepiece lens 152. An electronic finder, on which an image sensor receives the reflected light from the second mirror 120 via an image recomposing optical element and the object image is displayed on a display such as a liquid crystal monitor or the like, based on the output signals of the image sensor, may be provided in place of the optical finder 150.

The display unit 160 is positioned between the second mirror 120 and the optical focus detection system 140. The display unit 160 displays the focus adjustment condition inside the finder field, as shown in detail in FIG. 20(a), and includes a mask 161 with three apertures 161a–161c, three light emitting diodes 162a–162c that are arranged so as to correspond to the apertures 161a–161c of the mask 161 in a 1:1 ratio, and three prisms 163a–163c that refract the light from the light emitting diodes 162a–162c toward the apertures 161a–161c, respectively, of the mask 161. The display unit 160 is arranged in a position that is separated from the aperture 141a of the field of vision mask 140 so that the light rays guided to the optical focus detection system 140 will not be blocked. Aperture 161a of the mask 161 is formed in a circular shape that is meant to display the focused condition. Apertures 161b and 161c are formed in triangular shapes that point toward aperture 161a in order to indicate the front focus condition and rear focus condition, respectively.

The illumination and extinguishing of the light emitting diodes 162a–162c is controlled by the controlling circuit 170 via the driving circuit 175 shown in FIG. 18. The controlling circuit 170 determines whether the focus adjustment condition of the phototaking lens 100 is in the focused condition, front focus condition, or rear focus condition, based on the output signals from the image sensor 145, and illuminates the light emitting diode 162a if the lens is in the focused condition, the light emitting diode 162b if the lens is in the front focus condition, and the light emitting diode 162c if the lens is in the rear focus condition.

According to the structure described above, the light that passes through the photography lens 100 is divided into light transmitted by the first mirror 110 and light that is reflected from the first mirror 110. The transmitted light is guided toward the exposure surface of the film 130, and the reflected light is guided toward the second mirror 120. A portion of the light incident to the second mirror 120 passes the second mirror 120 and is guided to the optical focus detection system 140, and the other portion of the light is reflected toward the first mirror 110. A portion of the light reflected from the second mirror 120 passes the first mirror 110 and is guided to the optical finder 150. The object image reflected from the reflective surface of the second mirror 120 is observed through the eyepiece lens 152.

Figure 20A:
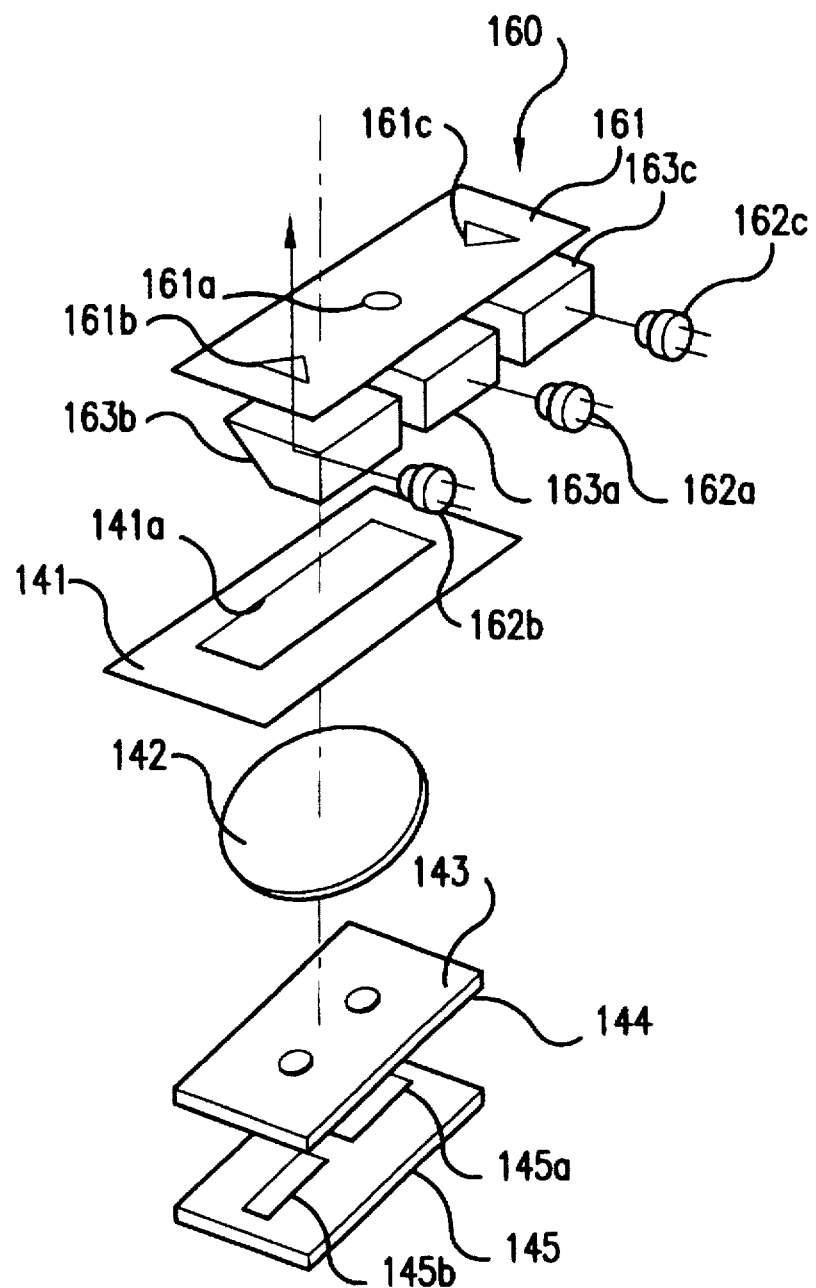
FIG. 20(a) is an illustration of the display unit and optical focus detection system of the camera of FIG. 18 and FIG. 20(b) and FIG. 20(c) illustrate display conditions of the finder field of the camera of FIG. 18.
Figure 20B:
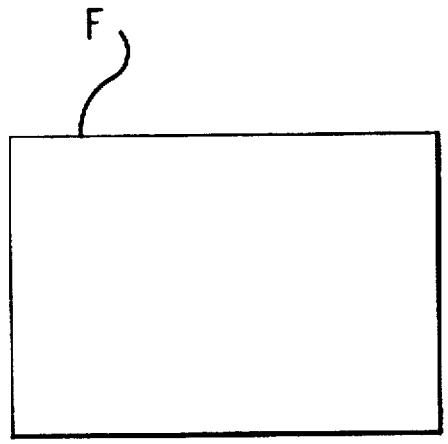
Figure 20C:
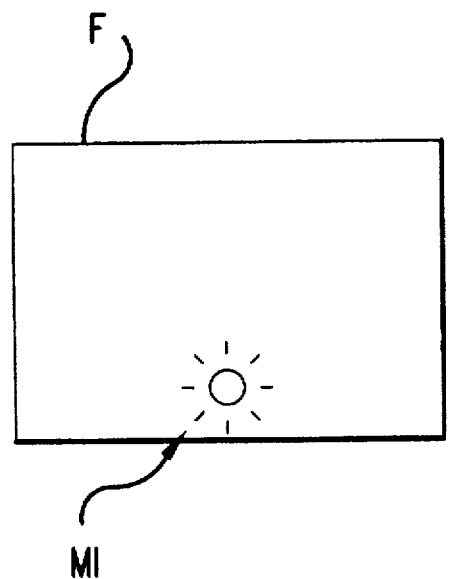

Since the display unit 160 is not on the optical path between the phototaking lens 100 and the eyepiece lens 152, and is hidden behind the reflective surface of the second mirror 120, as long as the light emitting diodes 162a–162c of the display unit 160 are all extinguished, no image of the display unit 160 appears in the finder field F, as shown in FIG. 20(b). When one of the light emitting diodes 162a–162c are illuminated, the light shaped by one of the apertures 161a–161c of the mask 161 passes through the second mirror 120, and the image of the apertures 161a–161c is superimposed on the object image of the reflective surface of the second mirror 120. Thus, for example, in the focused condition, as shown in FIG. 20(c), the focus mark M1, which corresponds to aperture 161a, is displayed inside the finder field F.

Figure 21A:
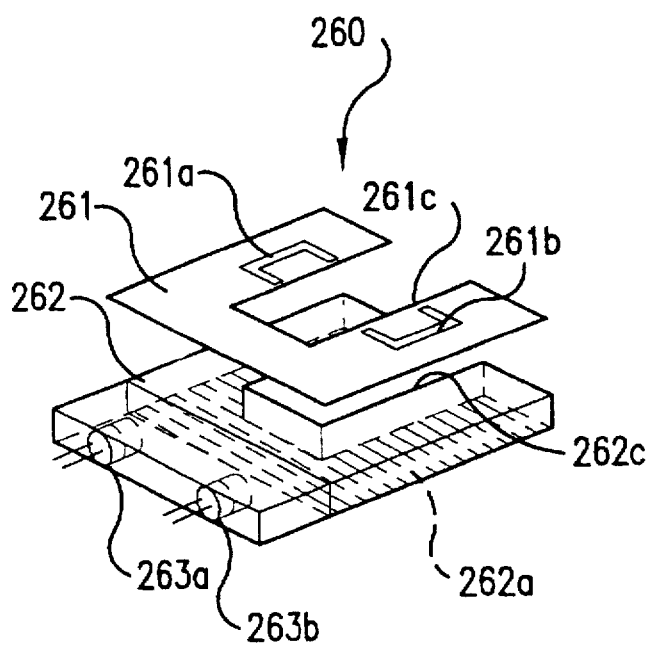
FIG. 21(a) is an illustration of a display unit for a camera according to a second embodiment of the second aspect of the present invention.
Figure 21B:
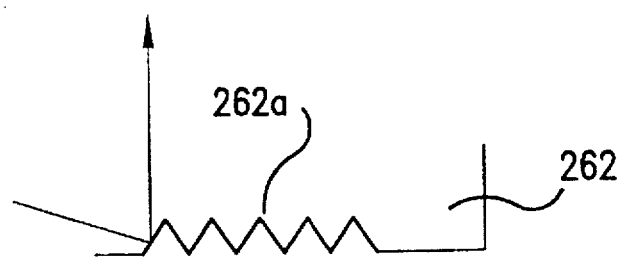
FIG. 21(b) and FIG. 21(c) are illustrations of a grating structure and a display condition of the finder field respectively.
Figure 21C:
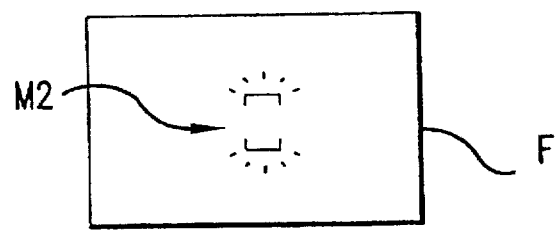

FIGS. 21(a)–21(c) are illustrations of a display unit, a grating structure, and a display condition of a second embodiment of the second aspect of the present invention. The present embodiment has an altered display unit when compared with the first embodiment. The components other than those shown in the drawing are the same as those of the first embodiment. As shown in FIG. 21(a), the display unit 260 comprises a mask 261, a light guiding body 262 that is positioned adjacent to the bottom side of the mask 261, and a pair of light emitting diodes 263a and 263b that are positioned to the side of the light guiding body 261. The position of the display unit 260 is on the rear surface side of the reflective surface of the second mirror 120, the same as in the first embodiment.

A pair of hooked parenthesis-shaped apertures 261a and 261b that establish the focus detection area are formed in the mask 261. The light guiding body 262 is formed from a substance that allows light to pass. As shown in FIG. 21(b), a fine grating is applied to the bottom surface 262a of the light guiding body 262 in order to turn the light that has been projected from the light emitting diodes 263a and 263b toward the apertures 261a and 261b. The mask 261 is fixed in a position such that the apertures 261a and 261b approximately coincide with both ends of the aperture 141a of the field of vision mask 141 (refer to FIG. 19) of the optical focus detection system 140. Notch units 261c and 262c are formed in the mask 261 and the light guiding body 262 so that the light that passes the second mirror 120 and is incident to the optical focus detection system 140 will not be blocked.

According to the structure described above, when the light emitting diodes 263a and 263b are illuminated, the image of the apertures 261a and 261b is superimposed onto the subject image of the reflective surface of the second mirror 120, and the mark M2, which indicates the focus detection area within the finder field F, is displayed as shown in FIG. 21(c). When the light emitting diodes 263a and 263b are extinguished, no image of the display unit 260 appears in the finder field F, as with the first embodiment. Since the optical focus detection system 140 and the display unit 260 are adjacent to each other, the focus detection area established in the optical focus detection system 140 and the display position of the display unit 260 can be easily adjusted.

Figure 22:
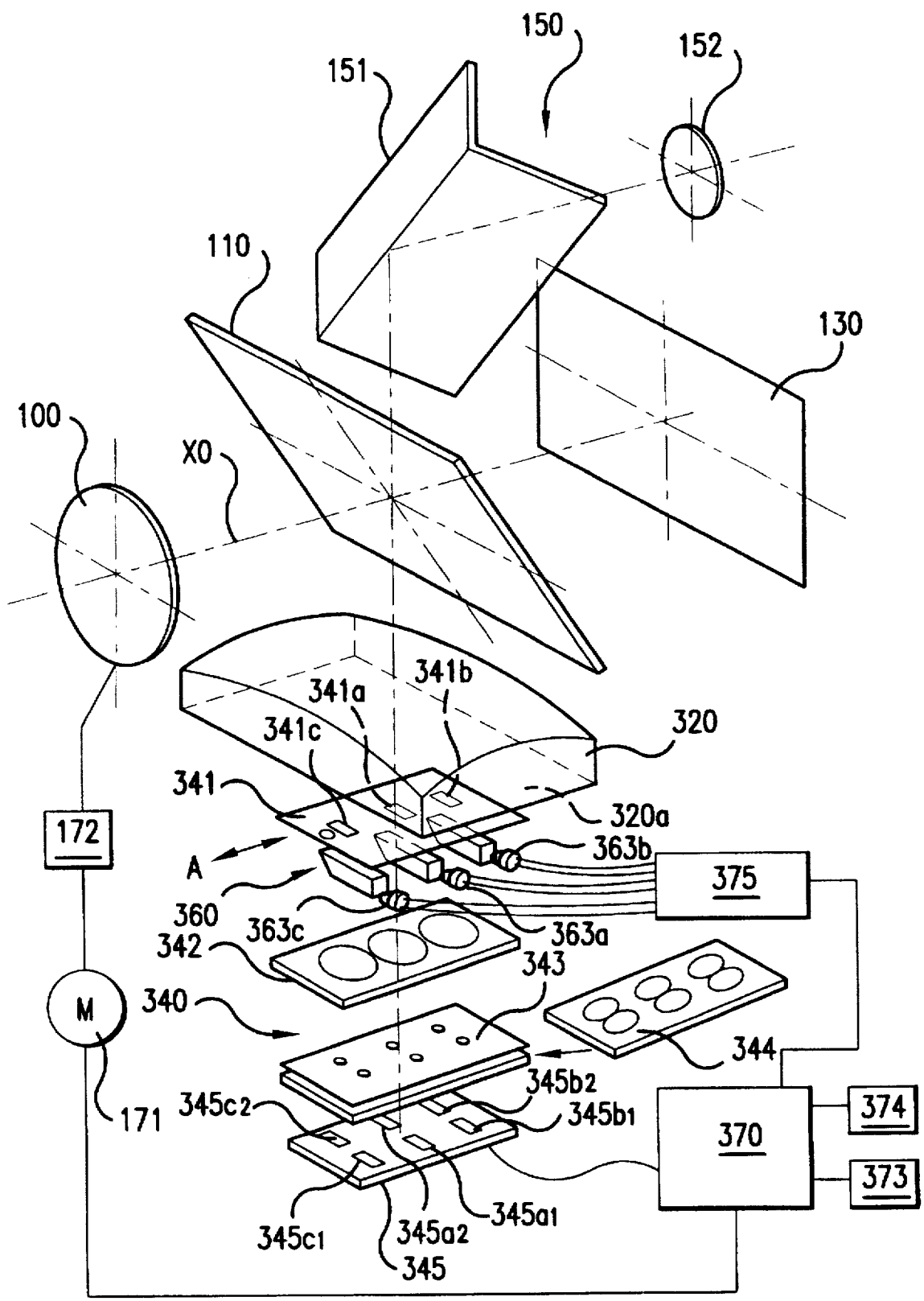
FIG. 22 is an illustration of a perspective side view of an optical system for the camera according to a third embodiment of the second aspect of the present invention.
Figure 23:
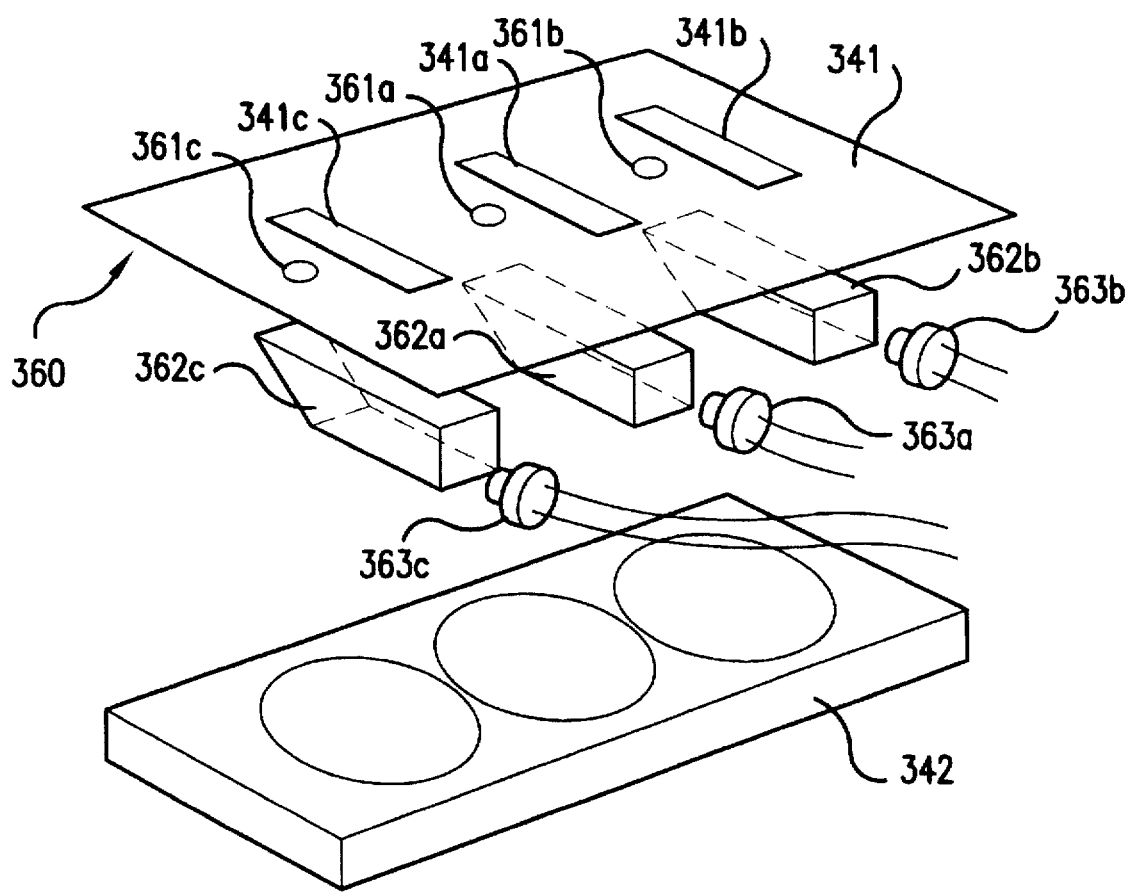
FIG. 23 is an illustration that shows an enlarged view of the components of the display unit of the optical system of FIG. 22.

FIG. 22 is an illustration of a perspective side view of an optical system for a camera according to a third embodiment of the second aspect of the present invention. The differences between this embodiment and the first embodiment are that a concave lens 320 is provided in place of the second mirror 120 of FIG. 19, the optical focus detection system 340 extracts light beams for focus detection from a plurality of focus detection areas within the photographic field, and a display unit 360 matches the optical focus detection system 340. The inside bottom surface of the concave lens 320 is a reflective surface 320a, that reflects a portion of the light that is incident to the concave lens 320 and allows the rest of the light to pass. The reflection ratio and transmission ratio of the reflective surface 320a are fixed over the entire surface.

The optical focus detection system 340 guides light transmitted through areas of the projection pupil surface of the phototaking lens 100 to the image sensor 345 via the field of view mask 341, the field lens 342, the diaphragm mask 343, and the separator lens 344. A focus detection area is set in the center of the photographic field, and an aperture 341a for preventing excessive backlight and apertures 341b and 341c for setting focus detection areas in positions separated from the center of the photographic field in the direction of arrow A in FIG. 7 are provided in the field of vision mask 341. Light receiving surfaces 345a1, 345a2, 345b1, 345b2, 345c1, and 345c2 are provided on an image sensor 345, forming a total of three pairs corresponding to the three focus detection areas, with the elements of one pair being positioned to the left and the elements of one pair being positioned to the right of one pair of focus detection areas. The field lens 342, the diaphragm mask 343, and the separator lens 344 are also structured so as to separate the image of each focus detection area to the corresponding pair of light receiving surfaces of the image sensor 345.

Electrical signals corresponding to the brightness distribution of the images that have been projected onto the light receiving surfaces are output from the image sensor 345. The defocus amount of the phototaking lens 100 is calculated by the control circuit 370 based on these output signals. The motor 171 is driven based on the calculated result, and the phototaking lens 100 is driven to a position that focuses the subject in one of the focus detection areas. The focus detection area among the three focus detection areas to which the phototaking lens 100 will be adjusted is changed according to the setting of a focus adjustment mode setting device 373 and of a focus detection area selecting device 374, which are connected to the controlling circuit 370.

The focus adjustment mode setting device 373 indicates to the controlling circuit 370 which of the automatic selection mode and the manual selection mode, that are provided for the selection of the focus detection area, is to be selected, based on the operation of the photographer. When the automatic selection mode has been selected, the controlling circuit 370 selects the focus detection area based on the output signals from the image sensor 345. For example, the focus detection area in which the distance to the subject is smallest is selected as the object of focus adjustment of the phototaking lens 100. If, on the other hand, the manual mode has been selected, the focus of the phototaking lens 100 is adjusted in relation to the focus detection area which the photographer has selected through the focus detection area selecting device 374.

The display unit 360 also serves as a mask that establishes the formation of emitted light for the field of view mask 341 of the optical focus detection system 340. As is shown in detail in FIG. 23, small holes 361a–361c are formed adjacent to apertures 341a–341c, that establish the focus detection areas. Prisms 362a–362c are positioned below the small holes 361a–361c, and light emitting diodes 363a–363c are positioned at the end of each prism 362a–362c. The light that is emitted from the light emitting diodes 363a–363c is deflected toward the field of vision mask 341 by the prisms 362a–362c.

The illumination and extinguishing of the light emitting diodes 363a–363c is controlled by the controlling circuit 370 shown in FIG. 22 via the driving circuit 375. When the phototaking lens 100 is focused with respect to the subject in one of the focus detection areas, the control circuit 370 causes the light emitting diode among the light emitting diodes 363a–363c that corresponds to this focus detection area to be illuminated. In other words, when the phototaking lens 100 is focused with respect to the subject of the focus detection area established in the aperture 341a of the field of view mask 341, the light emitting diode 363a is illuminated; when the phototaking lens 100 is focused with respect to the subject of the focus detection area established in the aperture 341b, the light emitting diode 363b is illuminated; and when the phototaking lens 100 is focused with respect to the subject of the focus detection area established in the aperture 341c, the light emitting diode 363c is illuminated. Thus a mark similar to the focus mark M1 of FIG. 20(c) is displayed in the finder field adjacent to the focus detection region that is currently selected.

Figure 24A:
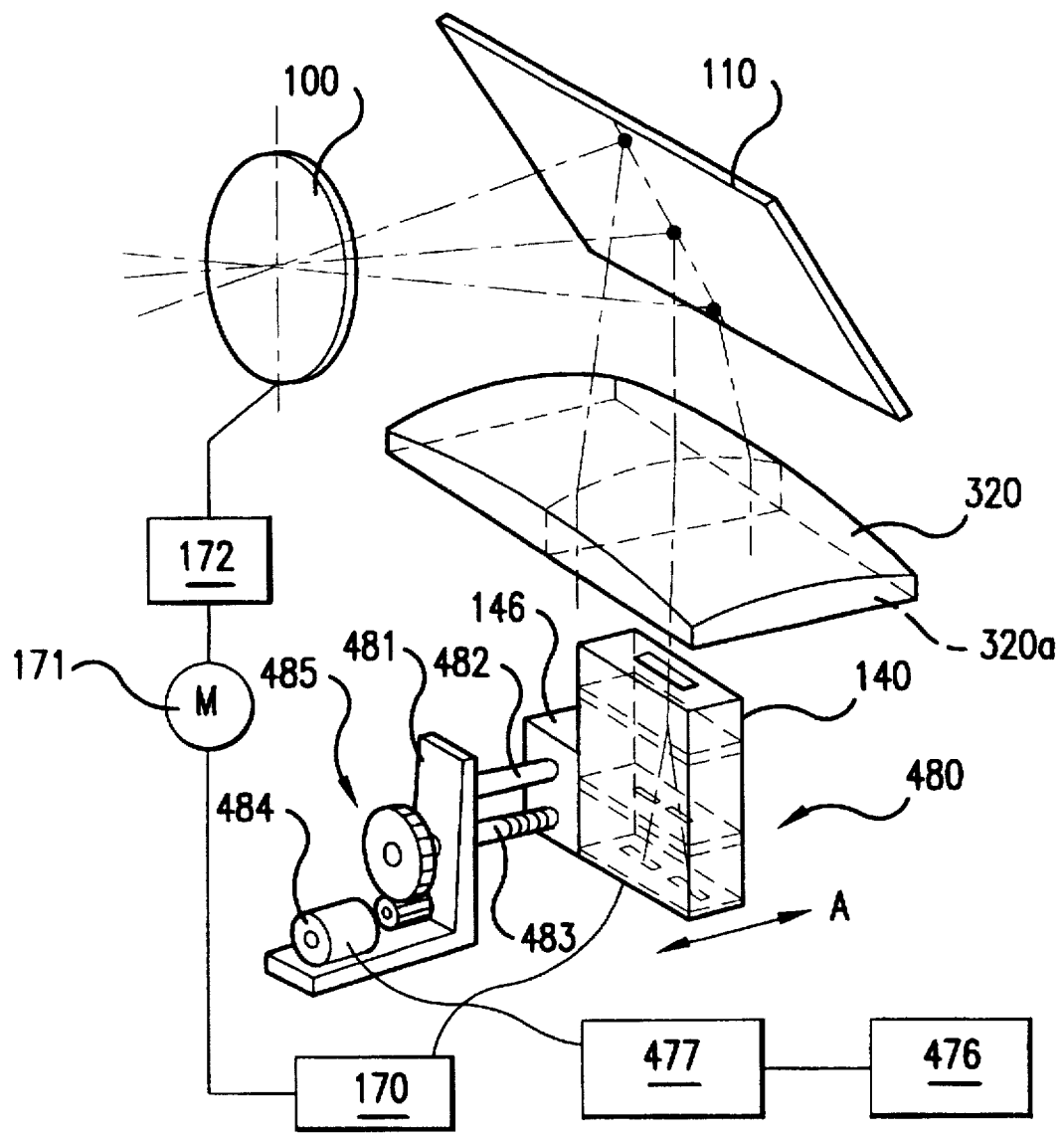
FIG. 24(a) is an illustration of a perspective side view of a camera optical system according to a fourth embodiment of the second aspect present invention.

FIG. 24(a) is an illustration of a perspective side view of a camera optical system according to a fourth embodiment of the second aspect of the present invention. The differences between this embodiment and the first embodiment (FIG. 18, FIG. 19) are that the concave lens 320 of the third embodiment is used in place of the second mirror 120 and that the optical focus detection system 140 has been made to be movable along the reflective surface 320a of the concave lens 320 by a moving mechanism 480. The moving mechanism 480 includes a frame 481 that is affixed to the camera body (not shown), a guide rod 482 that protrudes from the frame 481 and supports the housing 146 of the optical focus detection system 140 and allows the housing to move in the direction of arrow A in FIG. 24(a), a driving screw 483 that screws into the housing 146, a motor 484, and a gear system 485 that reduces the speed of the motor 484 and transmits the rotation of the motor 484 to the driving screw 483. The driving screw 483 rotates through the rotation of the motor 484, and the optical focus detection system 140 moves in the direction of arrow A in FIG. 24(a). Thus the focus detection area established in the optical focus detection system 140 is also changed to the direction of arrow A in FIG. 24(a).

When the photographer indicates through the input device 476 that the focus detection area is to be moved, this indication is transmitted to the area changing control circuit 477, and the rotation of the motor 484 is controlled based on the transmitted signal. A commonly known input mechanism, such as a track ball, command dial, or the like, is used on the input device 476. The driving of the motor 484 through the area changing control circuit 477 and the calculation of the defocus amount through the control circuit 170 commence in response to the half-press operation of the release button 400.

Figure 24B:
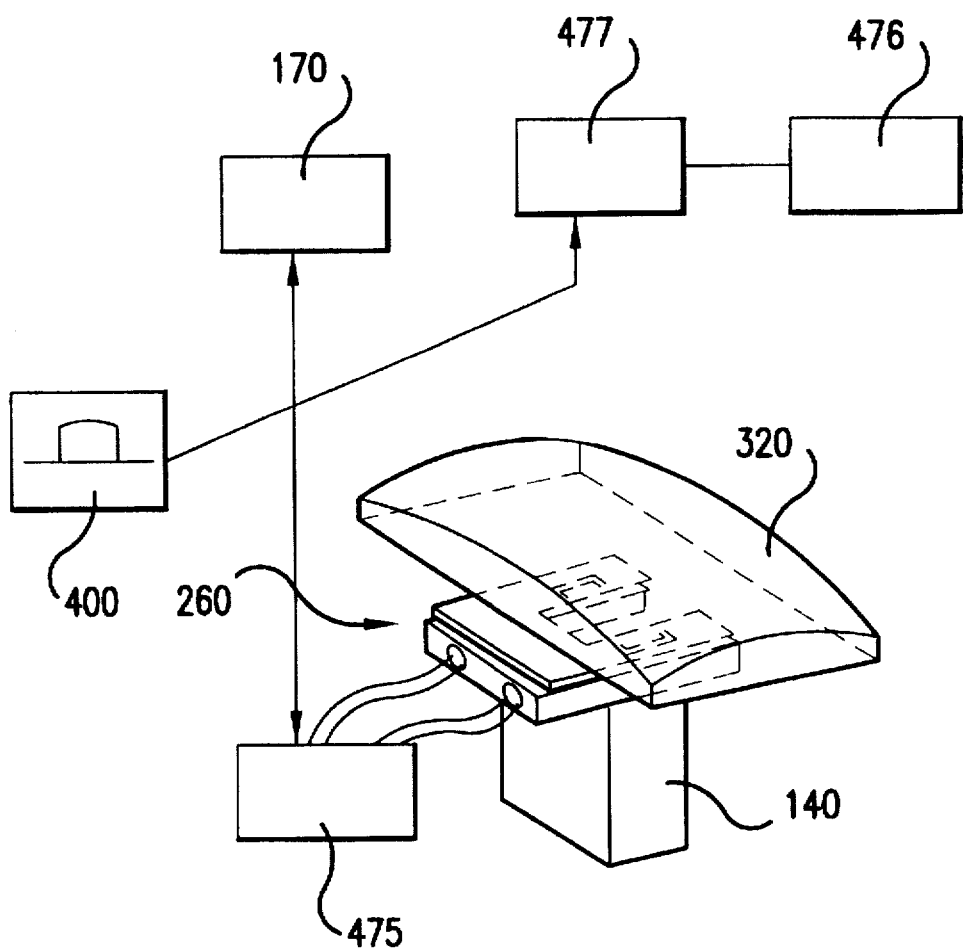
FIG. 24(b) is an illustration of an enlarged perspective side view of the display unit components.
Figure 24C:
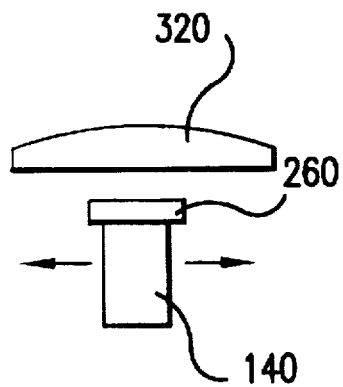
FIG. 24(c) is an illustration of a side view of the display unit components.

At this point, when the focus detection area moves inside the photographic field, a mark that shows the focus detection area cannot be provided directly on the reflective surface 320a of the concave lens 320. On the present embodiment, the same display unit 260 as on the second embodiment is arranged so as to move as one piece with the optical focus detection system 140, as shown in FIG. 24(b) and 24(c). Through this type of structure, the display position of the focus detection area inside the finder field through the display unit 260 changes along with the change in the position of the focus detection area. Thus the photographer can always reliably discern the focus detection area. A driving circuit 475 causes the display unit 260 to emit light in response to the half-press operation of the release button 400.

Figure 25B:
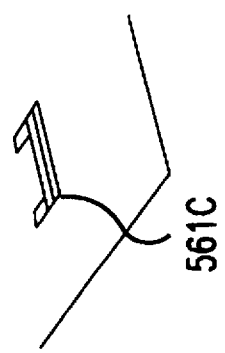
FIG. 25 is an illustration of a perspective side view of alternative optical components for a camera according to a fifth embodiment of the second aspect of the present invention.
Figure 25A:
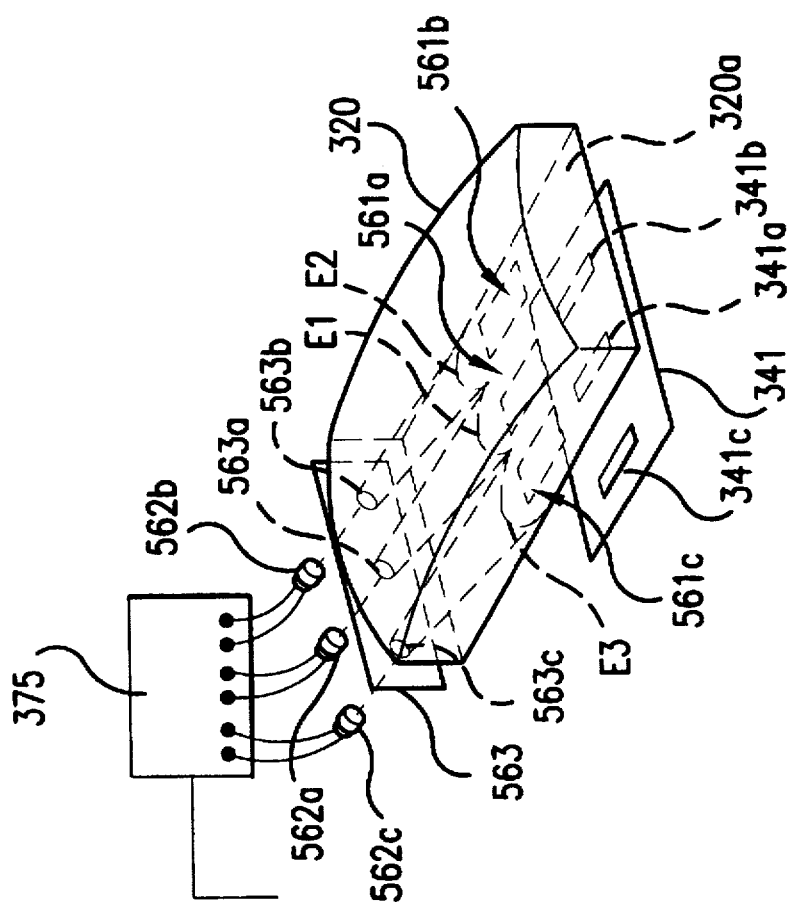

FIG. 25(a) is an illustration of a perspective side view of alternative optical components for a camera according to the fifth embodiment of the second aspect of the present invention. The components other than those depicted in the drawing are the same as on the third embodiment shown in FIG. 22.

As shown in FIG. 25(a), with the present embodiment, three pairs of hooked parenthesis-shaped marks 561a–561c are provided on the reflective surface 320a of the concave lens 320. Marks 561a–561c are formed on the reflective surface 320a through a fine grating process, as shown in FIG. 25(b). The cross section of the portion to which the grating process has been applied is the same as that shown in FIG. 21(b). Marks 561a–561c are aligned is with apertures 341a–341c of the field of vision mask 341 of the optical focus detection system 340.

Three light emitting diodes 562a–562c are provided at one side of the concave lens 320. The light emitted from the light emitting diodes 562a–562c is narrowed through the apertures 563a–563c of the mask 563, and illuminates only the small areas E1–E3 that include the marks 561a–561c (the areas enclosed by the dotted lines in FIG. 25(a)). The light incident to the marks 561a–561c is reflected toward the top of the concave lens 320 by the grating described above. The illumination and extinguishing of the light emitting diodes 562a–562c is controlled by the controlling circuit 370 shown in FIG. 22 via the driving circuit 375, the same as with the third embodiment.

With the embodiment, since marks 561a–561c are formed on the reflective surface 320a, the marks 561a–561c are illuminated by the light incident to the concave lens 320 even when the light emitting diodes 562a–562c are extinguished, and the marks 561a–561c can be seen in the finder field. When one of the light emitting diodes 562a–562c is illuminated, one of the marks 561a–561c is illuminated and the brightness of that mark increases. The photographer can then reliably discern for which of the three focus detection areas the photography lens 100 is focused. The illumination and extinguishing of the light emitting diodes 562a–562c may be controlled so that the selected result is shown at a step wherein one focus detection area is selected regardless of whether the phototaking lens 100 is focused. When it is sufficient to continually and equally display the three focus detection areas within the finder field, the light emitting diodes 562a–562c and the mask 563 may be omitted.

Figure 26A:
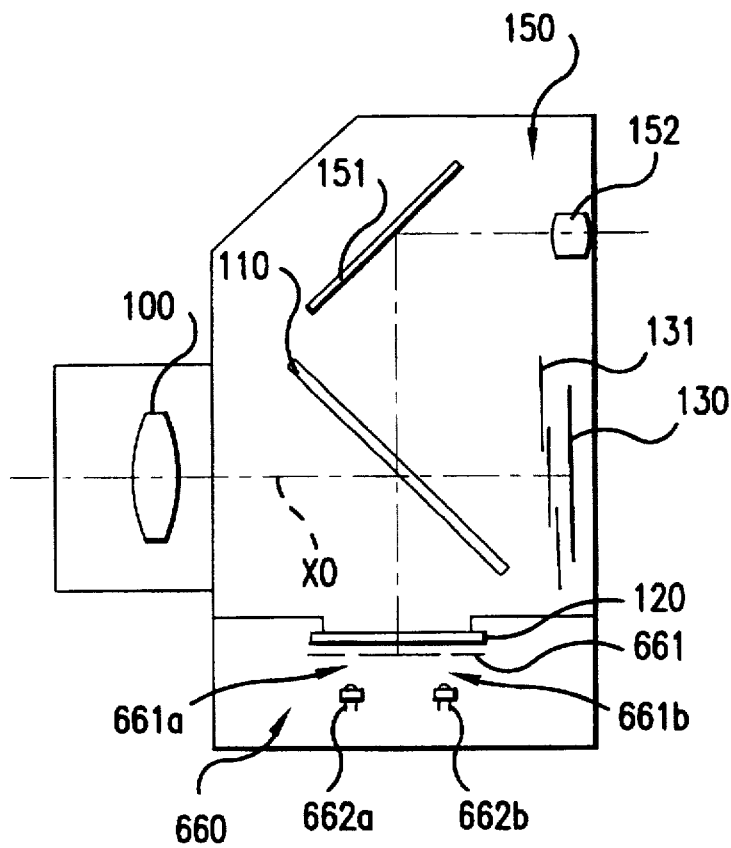
FIG. 26(a) is an illustration of an internal side view of a camera according to a sixth embodiment of the second aspect of the present invention.
Figure 26B:
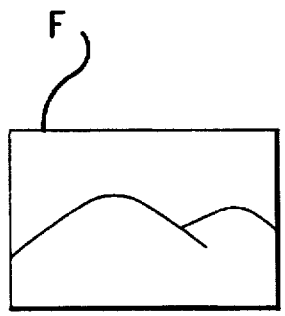
FIG. 26(b) and FIG. 26(c) are illustrations of display conditions of the finder field of the camera of FIG. 26(a).
Figure 26C:
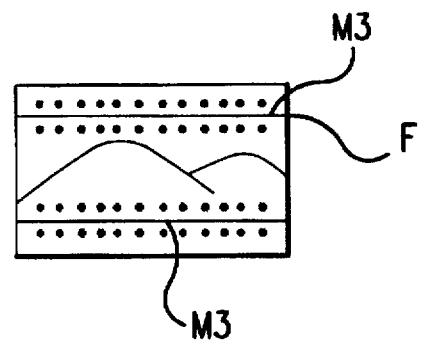

FIG. 26(a) is an illustration of an internal side view of a camera according to a sixth embodiment of the second aspect of the present invention. With the present embodiment, a display unit 660 is positioned on the rear surface side of the reflective surface of the second mirror 120. The display unit 660 includes a mask 661 with a pair of apertures 661a and 661b and light emitting diodes 662a and 662b that are provided below the apertures 661a and 661b. Apertures 661a and 661b extend in a linear shape in the long direction of the photographic field. Through this structure, when the light emitting diodes 662a and 662b are extinguished, no image of the mask 661 appears in the finder field F, as shown in FIG. 26 (b). When the light emitting diodes 662a and 662b are illuminated, two line-shaped marks M3 and M3, which are parallel to the long direction of the finder field F, are displayed within the finder field F as shown in FIG. 26(c). Thus, when applied to a camera on which the format of the photographic field is switched between a standard size and a flatter panoramic size, the line-shaped marks M3 and M3 can be used as the panoramic display frame. When photographing at the standard size, the marks M3 and M3 are completely extinguished, and any inconvenience upon viewing the finder field can be eliminated.

Figure 27A:
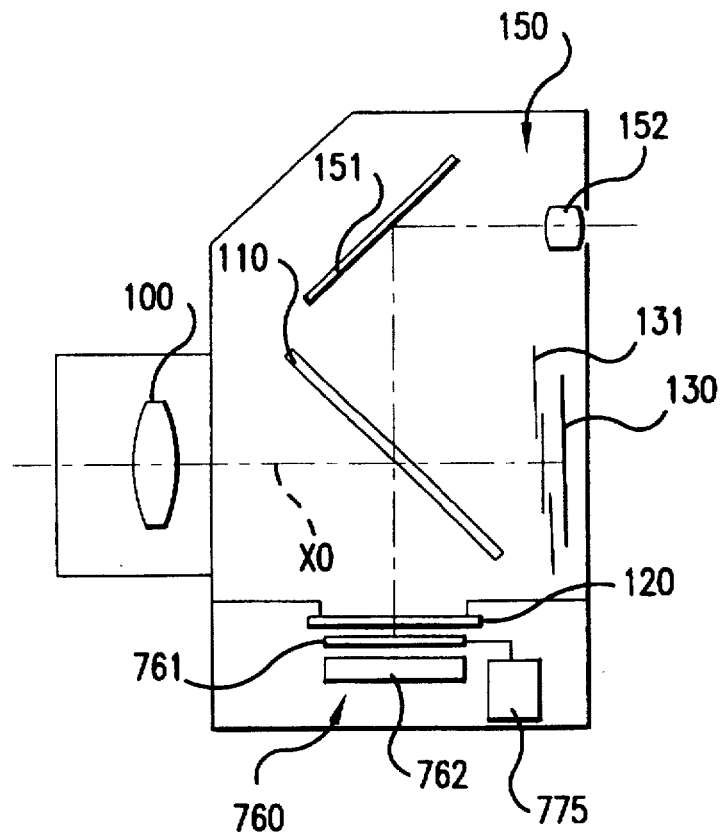
FIG. 27(a) is an illustration of an internal side view of a camera according to a seventh embodiment of the second aspect of the present invention.
Figure 27B:
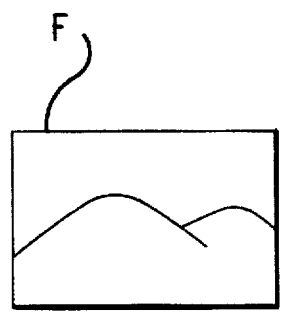
FIG. 27(b) and FIG. 27(c) are illustrations of display conditions of the finder field of the camera of FIG. 27(a)
Figure 27C:
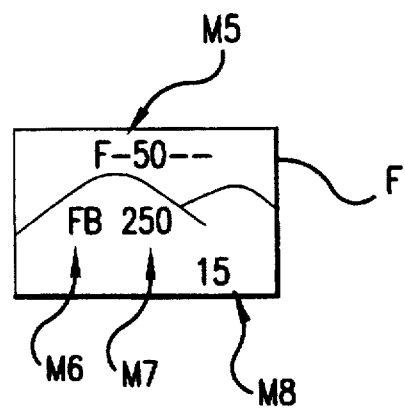

FIG. 27(a) is an illustration of an internal side view of a camera according to the seventh embodiment of a second aspect of the present invention. With the present embodiment, a display unit 760 is positioned on the rear surface side of the reflective surface of the second mirror 120. The display unit 760 includes a display panel 761, that changes the transmission ratio and reflection ratio, such as, for example, a liquid crystal panel or electrochromic device that carries out the display, and a backlight 762 that is positioned at the bottom surface of the display panel 761. A driving circuit 775 powers the display panel 761. The display surface of the display panel 761 is set to be the same size or larger than the object image of the entire photographic field that is guided to the second mirror 120. The light emitting surface of the backlight 762 is approximately the same size as the display surface of the display panel 761. A fluorescent tube or electroluminescent (EL) panel can be used as the backlight 762. In this example, too, when the backlight 762 is extinguished, the image of the display panel 761 does not appear in the finder field F, as shown in FIG. 27(b). When the backlight 762 is illuminated, the various information displayed by the display panel 761 is superimposed on the object image within the finder field F, as shown in FIG. 27(c). In FIG. 27(c), M5 is an image that displays the focal distance of the phototaking lens, M6 is an image that displays the diaphragm value, M7 is an image that displays the shutter speed, and M8 is an image that displays the photographic frame number of the film.

Figure 28A:
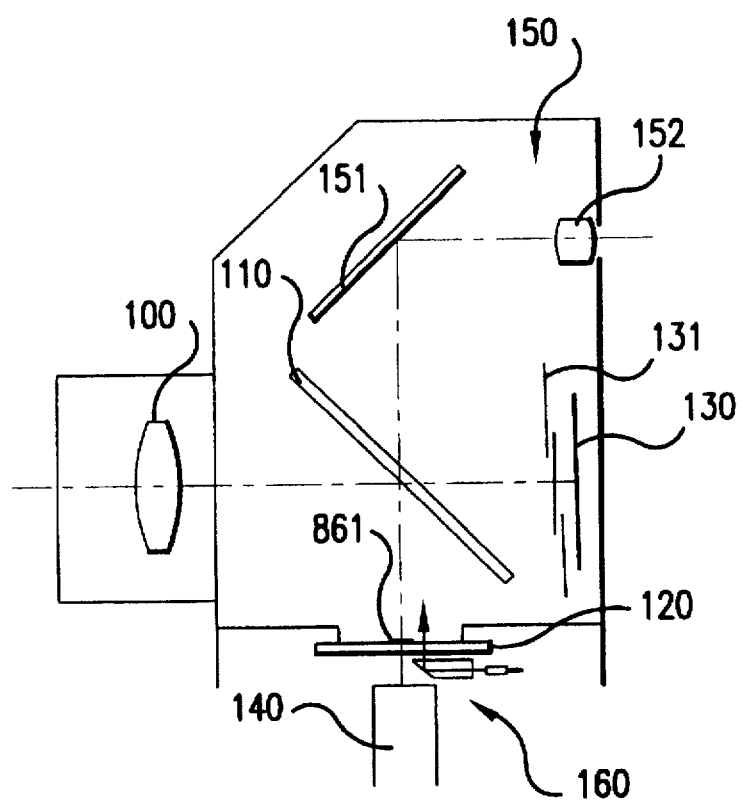
FIG. 28(a) is an illustration of an internal side view of a camera according to an eighth embodiment of the second aspect of the present invention and FIG. 28(b) and FIG. 28(c) are illustrations of display conditions of the finder field of the camera of FIG. 28(a)
Figure 28B:
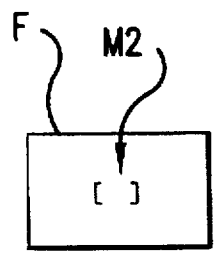
Figure 28C:
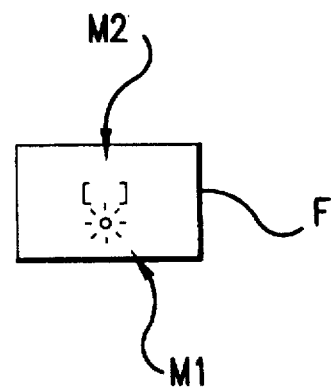

FIG. 28(a) is an illustration of an internal side view of a camera according to an eighth embodiment of the second aspect of the present invention. In this example, the display unit 160 of the first embodiment is positioned on the rear surface side of the reflective surface of the second mirror 120. In addition, a mark 861 for displaying the focus detection area is provided on the reflective surface of the second mirror 120. The mark 861 is, for example, directly imprinted onto the reflective surface of the second mirror 120, or else is provided by carrying out the grating process as in the fifth embodiment, or through some other method, and changes the reflection rate of the reflective surface. The shape of the mark 861 is the same as that of mark 561a of FIG. 25(a). Through the structure described above, when the phototaking lens 100 is not in the focused condition, the display unit 160 does not emit light, and only the mark M2, which indicates the focus detection area, is displayed within the finder field F, as shown in FIG. 28(b). When the photo lens 100 is focused, the focus mark M1 is displayed near the mark M2, as shown in FIG. 28(c).

With the embodiments described above, the phototaking lens 100 comprises an optical image forming system, the first mirror 110 comprises a first light dividing device, the second mirror 120 and the reflective surface 320a of the concave lens 320 comprise a second light dividing device, the optical finder 150 comprises a monitor device, the display units 160, 260, 360, 660, and 760 and the marks 561a–561c and 861 comprise superimposing devices, the display units 160, 260, 360, 660, and 760 comprise light emitting devices, the marks 561a–561c and 861 comprise specially configured areas that are provided on a reflective surface of the second light dividing device, and the light emitting diodes 562a–562c comprise illuminating devices. With the embodiments described above, the light passing the first mirror 110 is guided to the imaging position, but the light reflected from the first mirror 110 may also be guided to the imaging position. In both the fifth embodiment and the eighth embodiment of the second aspect of the present invention, on which an additional image is superimposed from the reflective surface side of the second light dividing means, a mark was provided directly on the reflective surface 320a, but a light emitting body may be arranged in a position separated from the reflective surface 320a and a fixed image may be projected onto the reflective surface 320a.

While this invention has been described in conjunction with specific embodiments thereof, it is evident that many alternatives, modifications and variations will be apparent to those skilled in the art. Accordingly, preferred embodiments of the invention as set forth herein are intended to be illustrative, not limiting. Various changes may be made without departing from the spirit and scope of the invention as defined in the following claims.

What is claimed is:

1. A camera, comprising:

an optical image forming system that transmits light from a subject to form an image at a primary imaging position;

a first light dividing device that receives light transmitted by said optical image forming system, transmits a first portion of said light and reflects a second portion of said light, wherein said first light dividing device directs said first portion or said second portion of said light to said primary imaging position;

a second light dividing device that receives the portion of said light that is not directed to the primary imaging position and that simultaneously reflects a third portion and transmits a fourth portion of the portion of said light received by said second light dividing device, wherein said second light dividing device is positioned to reflect said third portion toward said first light dividing device;

an optical focus detection system positioned to receive one of said third portion and said fourth portion; and a monitor device for monitoring a subject image, said monitor device positioned to receive the one of said third portion and said fourth portion that is not received by said optical focus detection system.

2. The camera of claim 1, wherein said second light dividing device comprises a partially reflecting mirror including a partially reflecting surface that uniformly reflects and uniformly transmits a predetermined ratio of the light received by said second light dividing device.

3. The camera of claim 1, wherein said second light dividing device includes a first area that uniformly reflects a first predetermined ratio of the light received by said second light dividing device and uniformly transmits a second predetermined ratio of the light received by said second light dividing device and includes a second area that uniformly reflects a third predetermined ratio of the light received by said second light dividing device and uniformly transmits a fourth predetermined ratio of the light received by said second light dividing device, wherein said third predetermined ratio is greater than said first predetermined ratio and said fourth predetermined ratio is less than said second predetermined ratio.

4. The camera of claim 1, further comprising a convergence device for converging at least one of said third portion and said fourth portion toward an optical axis of said optical image forming system.

5. The camera of claim 1, wherein said second light dividing device comprises a light diffusion device, and said second light dividing device is positioned so that a real image of said subject is formed at said light diffusion device when said primary imaging position is located at an in focus position for said camera.

6. The camera of claim 1, wherein said first light dividing device directs said first portion toward said primary imaging position and directs said second portion toward said second light dividing device.

7. The camera of claim 1, wherein said first light dividing device directs said second portion toward said primary imaging position and directs said first portion toward said second light dividing device.

8. The camera of claim 1, wherein said second light dividing device comprises a partially reflecting mirror including a partially reflecting surface that uniformly reflects and uniformly transmits a predetermined ratio of light received by said second light dividing device.

9. The camera of claim 6, wherein said first light dividing device transmits a portion of said third portion of said light to one of said optical focus detection system and said monitor device.

10. The camera of claim 7, wherein said first light dividing device reflects a fifth portion of said third portion of said light to one of said optical focus detection system and said monitor device.

11. The camera of claim 1, wherein said third portion is directed to said monitor device, and said fourth portion is directed to said optical focus detection system, and wherein said second light dividing device comprises a concave reflector that converges and directs said third portion to said monitor device.

12. The camera of claim 1, wherein said first portion is directed to said primary imaging position, said fourth portion is directed to said optical focus detection system, and said third portion is directed to said monitor device; and a convergent lens positioned between said first light dividing device and said second light dividing device to converge light of said third portion.

13. The camera of claim 6, wherein said fourth portion is directed toward said optical focus detection system, said third portion is directed toward said monitor device, and said second light dividing device comprises a partially reflecting mirror including a partially reflecting surface that uniformly reflects and uniformly transmits a predetermined ratio of the light received by said second light dividing device.

14. The camera of claim 7, wherein said fourth portion is directed toward said optical focus detection system, said third portion is directed toward said monitor device, and said second light dividing device comprises a partially reflecting mirror including a partially reflecting surface that uniformly reflects and uniformly transmits a predetermined ratio of the light received by said second light dividing device.

15. The camera of claim 6, wherein said optical focus detection system receives luminous flux for focus detection from approximately the entire area of said first light dividing device.

16. The camera of claim 1, wherein said monitor device is adapted to receive at least a portion of said third portion and is adapted to display an image of said subject, and wherein said second light dividing device includes a reflective surface reflecting said third portion positioned at an image of said subject; and a superimposing device that superimposes a specified additional image on an image of said subject positioned at said reflective surface.

17. The camera of claim 16, wherein said superimposing device comprises a light emitting device for emitting light in a pattern that corresponds to said additional image provided on a side of said reflective surface opposite to said first light dividing device.

18. The camera of claim 16, wherein said superimposing device superimposes said additional image on said reflective surface from a reflective surface side of said second light dividing device.

19. The camera of claim 18, wherein said superimposing device comprises areas of said reflective surface corresponding to the said specified additional image with reflection characteristics different from the rest of said reflective surface.

20. The camera of claim 19, further comprising an illumination device for illuminating said areas.

21. The camera of claim 16, wherein said optical focus detection system is adapted to receive focus detection light rays from a focus detection area positioned on a side of said reflective surface opposite to said first light dividing device, wherein said specified additional image includes information related to focus detection.

22. The camera of claim 21, wherein said superimposing device comprises a light emitting device emitting light on said reflective surface and positioned on the side of said reflective surface opposite to said first light dividing device, said optical focus detection system movable along said reflective surface, and said light emitting device movable as one piece with said optical focus detection system.

23. The camera of claim 22, wherein said additional image is guided to an area at the perimeter of an area corresponding to said focus detection area.

24. A camera, comprising:

an optical image forming system that transmits light from a subject to form an image at a primary imaging position;

a first light dividing device that receives light transmitted by said optical image forming system, transmits a first portion of said light and reflects a second portion of said light, wherein said first light dividing device directs said first portion or said second portion of said light to said primary imaging position;

a second light dividing device that receives the portion of said light that is not directed to the primary imaging position and that simultaneously reflects a third portion and transmits a fourth portion of the portion of said light received by said second light dividing device;

an optical focus detection system positioned to recieve one of said third portion and said fourth portion;

a monitor device for monitoring a subject image, said monitor device positioned to receive the one of said third portion and said fourth portion that is not received by said optical focus detection system; and a convergence device for converging at least one of said third portion and said fourth portion toward an optical axis of said optical image forming system.

25. A camera, comprising:

an optical image forming system that transmits light from a subject to form an image at a primary imaging position;

a first light dividing device that receives light transmitted by said optical image forming system, transmits a first portion of said light and reflects a second portion of said light, wherein said first light dividing device directs said first portion or said second portion of said light to said primary imaging position;

a second light dividing device that receives the portion of said light that is not directed to the primary imaging position and that simultaneously reflects a third portion and transmits a fourth portion of the portion of said light received by said second light dividing device;

an optical focus detection system positioned to receive one of said third portion and said fourth portion;

a monitor device for monitoring a subject image, said monitor device positioned to receive the one of said third portion and said fourth portion that is not received by said optical focus detection system, wherein said first portion is directed to said primary imaging position, said fourth portion is directed to said optical focus detection system, and said third portion is directed to said monitor device; and a convergent lens positioned between said first light dividing device and said second light dividing device to converge light of said third portion.

* * * * *